United States Patent [19]
Imanishi

[11] Patent Number: 5,852,422
[45] Date of Patent: Dec. 22, 1998

[54] SWITCHED RETRACTABLE, EXTENDABLE, DUAL ANTENNAS FOR PORTABLE RADIO

[75] Inventor: Yasuhito Imanishi, Hyogo, Japan

[73] Assignee: Mitsubishi Denki Kabushiki Kaisha, Tokyo, Japan

[21] Appl. No.: 788,347

[22] Filed: Jan. 27, 1997

Related U.S. Application Data

[63] Continuation of Ser. No. 392,265, Feb. 22, 1995, abandoned.

[30] Foreign Application Priority Data

Apr. 6, 1994 [JP] Japan .................................. 6-068627

[51] Int. Cl.⁶ ...................................................... H01Q 1/24
[52] U.S. Cl. ........................... 343/702; 343/729; 343/901
[58] Field of Search ................................... 343/702, 790, 343/791, 901, 725, 729, 900, 828; H01Q 1/24

[56] References Cited

U.S. PATENT DOCUMENTS

| | | | |
|---|---|---|---|
| 4,313,119 | 1/1982 | Garay et al. | 343/702 |
| 4,860,024 | 8/1989 | Egashira | 343/702 |
| 5,353,036 | 10/1994 | Baldry | 343/702 |
| 5,374,937 | 12/1994 | Tsunekawa et al. | 343/702 |
| 5,412,392 | 5/1995 | Tsunekawa | 343/702 |
| 5,446,469 | 8/1995 | Makino | 343/702 |

FOREIGN PATENT DOCUMENTS

| | | |
|---|---|---|
| 508836 | 10/1992 | European Pat. Off. . |
| 518526 | 12/1992 | European Pat. Off. . |
| 523867 | 1/1993 | European Pat. Off. . |
| 719656 | 4/1942 | Germany . |

OTHER PUBLICATIONS

Patent Abstracts of Japan, vol. 13, No. 429, E823, 1160101, Jun. 1989.

*Primary Examiner*—Michael C. Wimer
*Attorney, Agent, or Firm*—Rothwell, Figg, Ernst & Kurz

[57] ABSTRACT

High gain antenna equipment is provided by improving gain with optimal impedance matching with an antenna element in a stored state as well as in an extended state. The antenna equipment is provided with a radio communication device housed in a case, a pullout type antenna element, a coil acting as a matching circuit element in an extended state of the antenna element and as a helical antenna in a stored state, and a switch connected to the coil at one end which is brought into contact at the other end with a ground terminal when the antenna element is in an extended state and which is brought into contact with an open terminal when the antenna element is in a stored state.

28 Claims, 40 Drawing Sheets

Fig. 1 A
Fig. 1 B
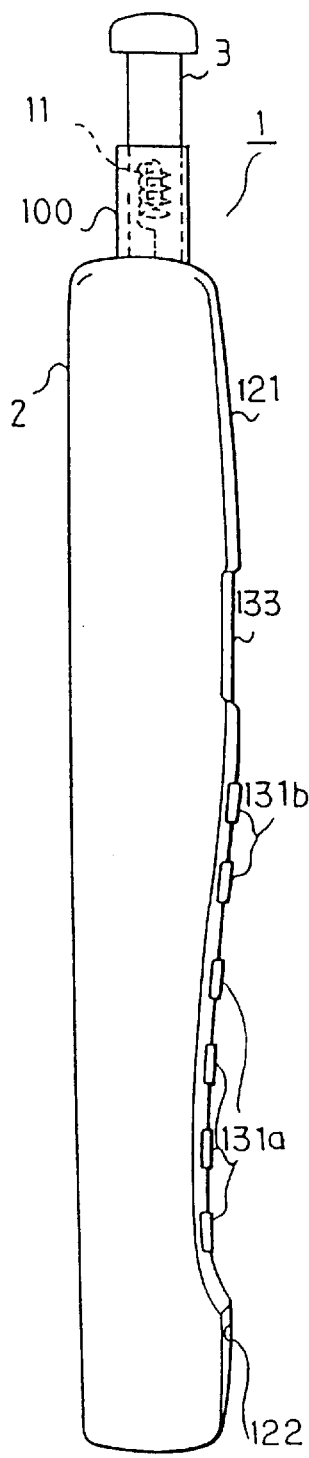
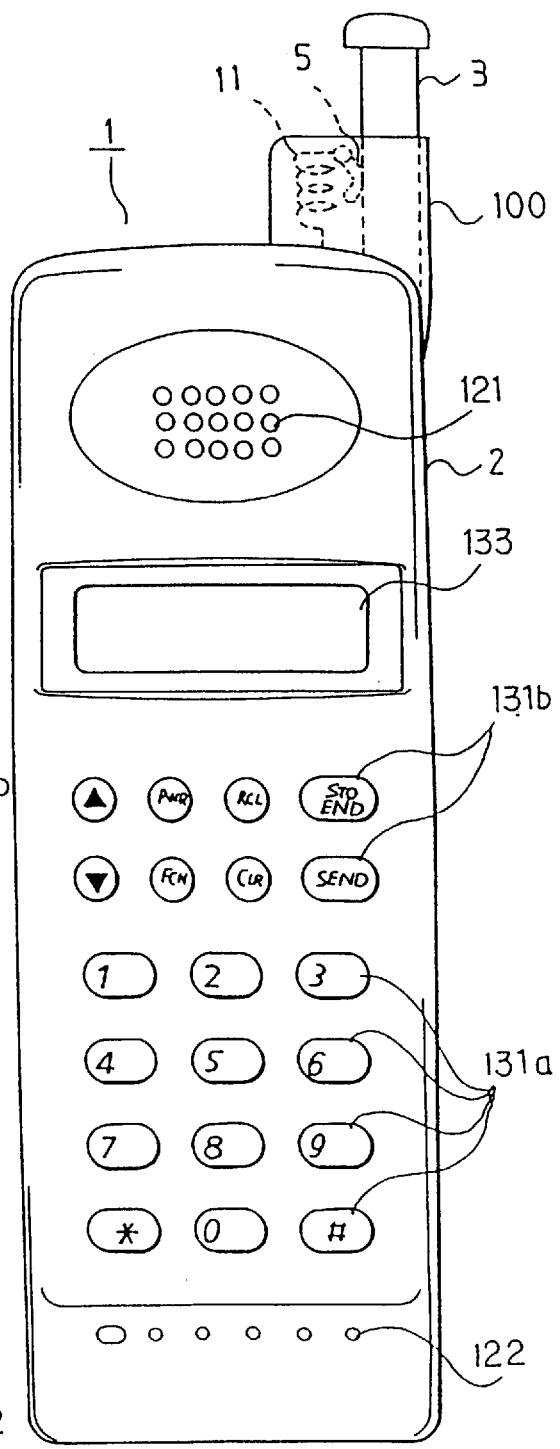

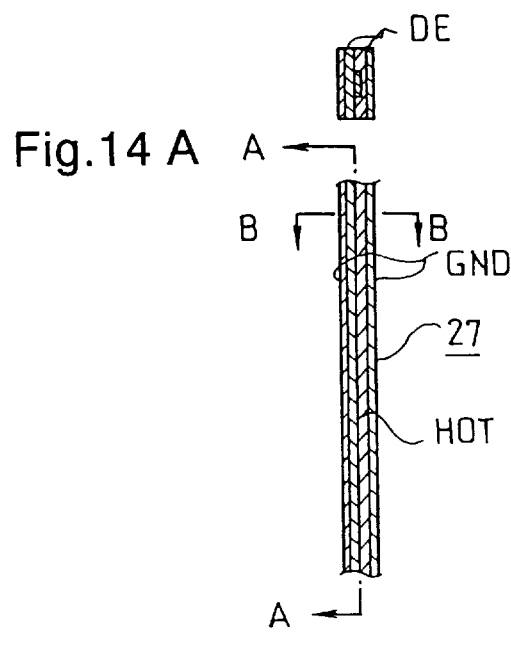
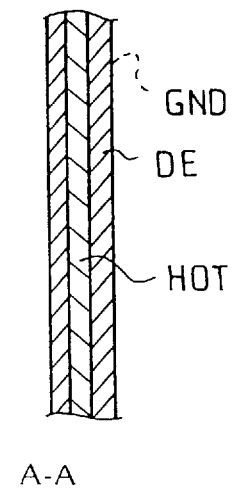

Fig.15 B
B-B
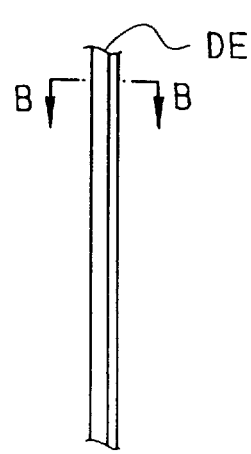
Fig.15 C
Fig.15 A
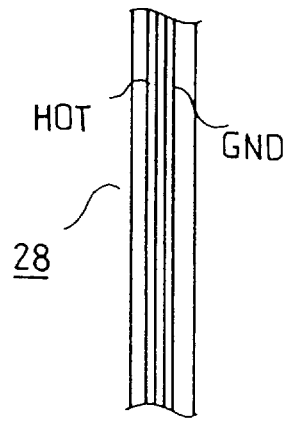

A—A

B-B

C-C

D-D

E-E

F-F

E-E

F-F

Fig.55 A
CONVENTIONAL ART
Fig.55 B
CONVENTIONAL ART
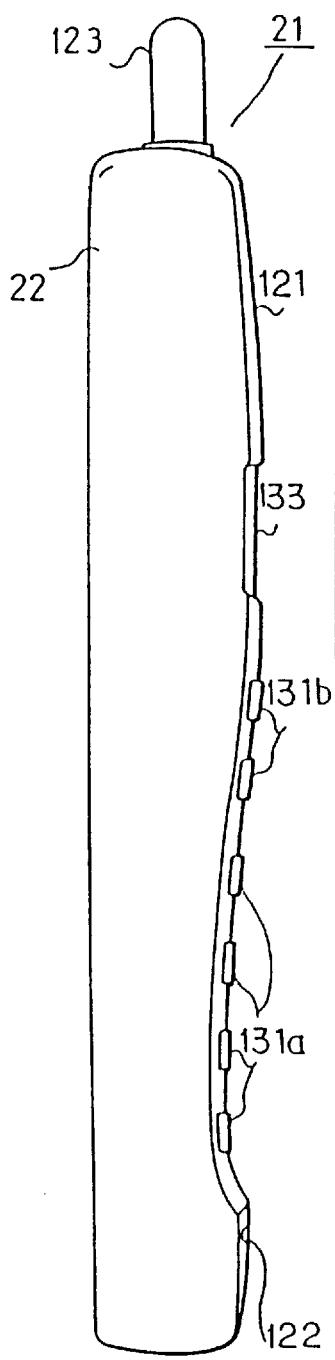
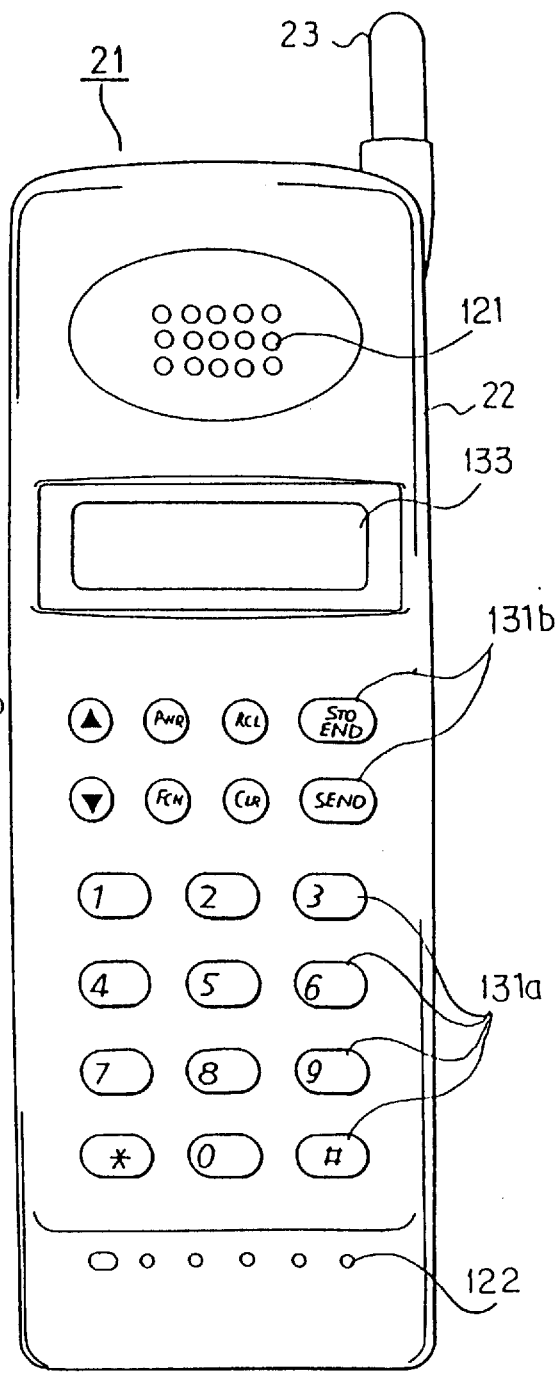

SWITCHED RETRACTABLE, EXTENDABLE, DUAL ANTENNAS FOR PORTABLE RADIO

This is a continuation of application Ser. No. 08/392,265, filed Feb. 22, 1995, abandoned.

BACKGROUND OF THE INVENTION

1. Field of the Invention

The present invention relates to antenna equipment which is applicable to any portable radio communication device used specifically in a mobile environment such as a motor vehicle.

2. Description of the Conventional Art

FIGS. 51 and 52 show cross sectional views of conventional antenna equipment, provided in a radio communication device, as disclosed in Japanese Unexamined Patent Publication No.160101/1989. Referring to the figures, a case 22 of a radio communication device 21 houses a pullout type long cylindrical antenna element 23, a radio circuit 24 and a connection terminal 25. The connection terminal 25 is electrically connected to the radio circuit 24 and is also selectively connected to connection terminals 23a and 23b of antenna element 23. FIGS. 53 and 54 show connection diagrams of the conventional antenna equipment of FIGS. 51 and 52, respectively. FIGS. 55A and 55B show an example of a conventional radio communication device provided with conventional antenna equipment.

Operation of the conventional antenna equipment is now discussed. In reference to FIGS. 51 and 53, the antenna element 23 is pulled out of the case 22 of the radio communication device 21 to an extended position. A connection terminal 23a at a lower end of the antenna element 23 is brought into contact with the connection terminal 25 to connect the extended antenna element 23 to the radio circuit 24. In reference to FIGS. 52 and 54, the antenna element 23 is stored in the radio communication device 21 in a retracted position. A connection terminal 23b at an upper end of the antenna element 23 is brought into contact with the connection terminal 25 to connect the retracted antenna element 23 to the radio circuit 24. Thus, the conventional antenna equipment is designed to selectively connect the antenna element 23 to the connection terminal 25 by way of not only the connection terminal 23a at the lower end in an extended state of the antenna element but also by the connection terminal 23b at the upper end in a retracted state of the antenna element. Therefore, the conventional antenna equipment can work as an antenna in a stored, retracted state of the antenna element 23 in the radio communication device 21. The radio circuit 24 includes a matching circuit, which is not illustrated in the figures, for an optimal matching with the antenna element 23 in an extended state.

According to the conventional antenna equipment, the single antenna element is required to work in both an extended state and in a stored state. As a result, optimal impedance matching can be achieved with the antenna element in an extended state. On the other hand, however, with the antenna element in a stored state an impedance mismatching may occur due to the radio circuit 24 and the antenna element 23 being too close to each other, as shown in FIG. 52 where they are separated by a small distance W, causing the antenna element to be grounded. This may lead to poor gain performance of the antenna.

The present invention solves the above stated problem. One of the objects of the invention is to provide antenna equipment which can achieve optimal impedance matching having improved gain performance with an antenna element in a stored state as well as in an extended state.

SUMMARY OF THE INVENTION

This and other objects are accomplished by the following aspects of the present invention.

According to one aspect of the present invention, an antenna equipment may include a case containing a radio circuit, a first antenna element, connected to the radio circuit, which is movable between a stored position within the case and an extended position outside of the case, and means, connected to the first antenna element, for acting as a matching circuit element when the first antenna element is in the extended position and as a second antenna element when the first antenna element is in the stored position.

The acting means may include a first terminal which is coupled to one end of the first antenna element when the first antenna element is in the stored position, and which is coupled to a second end of the first antenna element when the first antenna element is in the extended position.

The antenna equipment may further include a signal line connected between the first antenna element and the radio circuit.

The signal line may be selected from the group of a coaxial strip line, a coaxial line, a strip line, a triplet line, a Lecher line, and a coaxial line having a predefined shaped shield.

The acting means may be selected from the group of a coil, a meander board, a chip, a line element, and a board element.

The second antenna element may be selected from the group of a helical antenna, a reverse L shaped line antenna, and a reverse L shaped board antenna.

According to another aspect of the present invention, a method of communication using antenna equipment including first and second antenna elements coupled to a radio circuit may include the steps of extending the first antenna element to an extended position for a first communication condition, providing the second antenna element as a matching circuit for the first antenna element in the extended position, retracting the first antenna element to a stored position for a second communication condition, and providing the second antenna element as an antenna when the first antenna element is in the stored position.

BRIEF DESCRIPTION OF THE DRAWINGS

In the drawings:

FIG. 1A shows a side view of a radio communication device provided with antenna equipment according to a first embodiment of the present invention;

FIG. 1B shows a front view of the radio communication device of FIG. 1A;

FIG. 14A shows a sectional side view of a feed line of antenna equipment according to a fourth embodiment of the present invention.

FIG. 14B shows a B—B sectional front view of the feed line of FIG. 14A.

FIG. 14C shows an A—A sectional view of the feed line of FIG. 14A.

FIG. 15A shows a front view of a feed line of antenna equipment according to a fifth embodiment of the present invention.

FIG. 15B shows a side view of the feed line of FIG. 15A.

FIG. 15C shows a B—B sectional front view of the feed line of FIG. 15B.

FIG. 16A.

FIG. 55A shows a side view of a conventional radio communication device provided with the conventional antenna equipment.

FIG. 55B shows a front view of the radio communication device of FIG. 55A.

DESCRIPTION OF THE PREFERRED EMBODIMENTS

Embodiment 1

Figure 2:
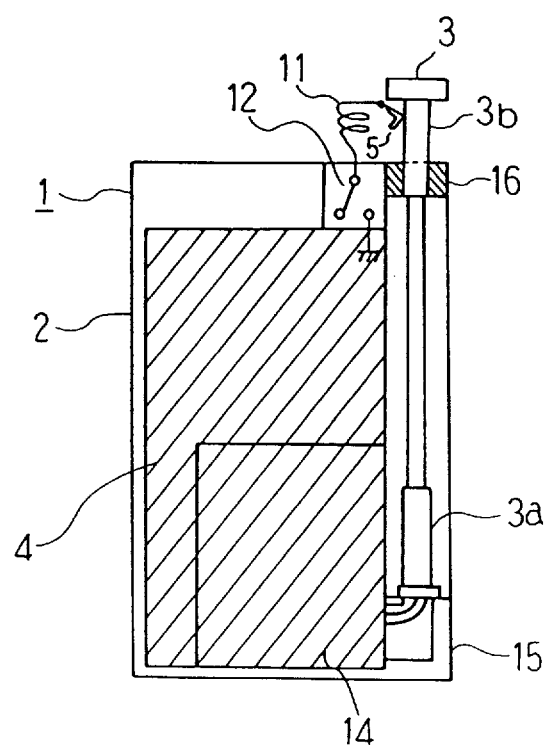
FIG. 2 shows a sectional side view of the antenna equipment provided in the radio communication device of FIGS. 1A and 1B with an antenna element in a stored state.
Figure 3:
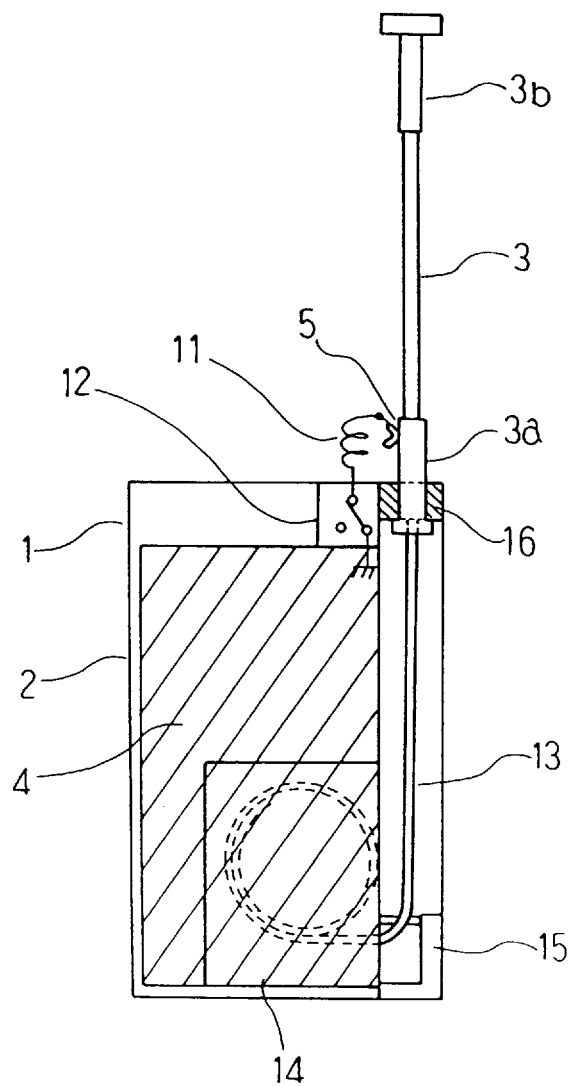
FIG. 3 shows a sectional side view of the antenna equipment of FIG. 2 with the antenna element in an extended state.
Figure 4:
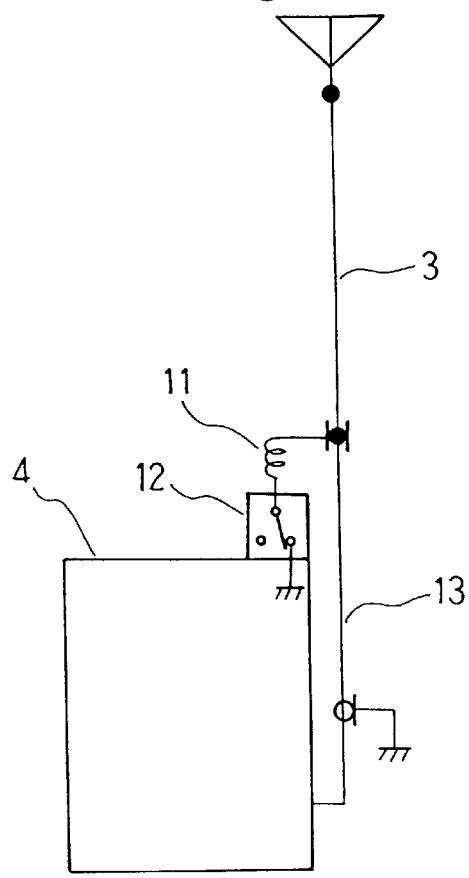
FIG. 4 shows a connection diagram of the antenna equipment of FIG. 3.
Figure 5:
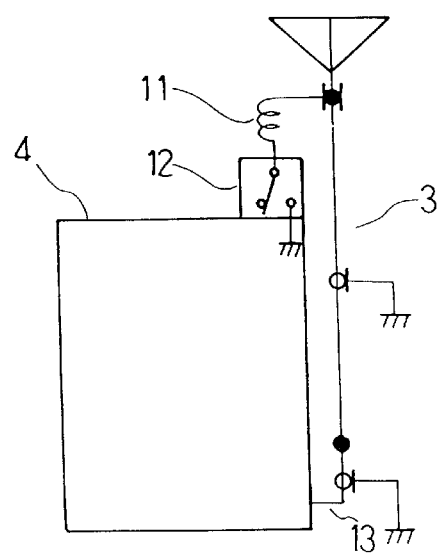
FIG. 5 shows a connection diagram of the antenna equipment of FIG. 2.

A first embodiment of the invention will be described in reference to FIGS. 1 through 7. FIGS. 1A and 1B show a radio communication device provided with antenna equipment according to this embodiment. Referring to the figures, the radio communication device 1 has an antenna element 3 for transmitting and receiving electric wave signals, a receiver 121, a transmitter 122, dial pushbuttons 131$a$, function keys 131$b$, a display 133 for displaying alphanumeric characters and symbols, and a cap 100. The cap 100 supports the antenna element 3 and contains therein a coil 11 and a connection terminal 5. FIGS. 2 through 6 show simplified diagrams of the radio communication device. Referring to the figures, the radio communication device 1 includes a case 2 for housing the radio communication device 1, a pullout type cylindrical antenna element 3, a connection terminal 3$a$ at a lower end of the antenna element, a connection terminal 3$b$ at an upper end of the antenna element, a radio circuit 4, and the connection terminal 5 which is brought into contact with the connection terminal 3$a$ at the lower end of the antenna element in an extended state and with the connection terminal 3$b$ at the upper end of the antenna element in a stored state. The coil 11 is connected to the connection terminal 5 at one end and to a switch 12 at the other end. The switch 12 is brought into contact with a ground terminal connected to a ground of the radio circuit 4 with the cylindrical antenna element 3 in an extended state as shown in FIG. 3. The switch 12 is brought into contact with an open terminal or open circuit in a stored state of the cylindrical antenna element 3 as shown in FIG. 2. A feed (coaxial) line 13 is connected to the connection terminal 3$a$ at the lower end of the antenna element as shown in FIG. 3. The feed line 13 is also connected to the radio circuit 4 at the other end thereof. A feed line storage compartment 14 stores the feed line 13 in a stored state of the cylindrical antenna element. A stopper 16 holds the connection terminal 3$a$ at the lower end of the antenna element and prevents the antenna element from coming out of the device in an extended state of the cylindrical antenna element 3. A stopper 15 holds the connection terminal 3$a$ at the lower end of the antenna element to stabilize the element in a fixed position with the cylindrical antenna element 3 in a stored state. The stopper 15 protects the feed line from possible damage with the antenna element 3 in a stored state.

Figure 6:
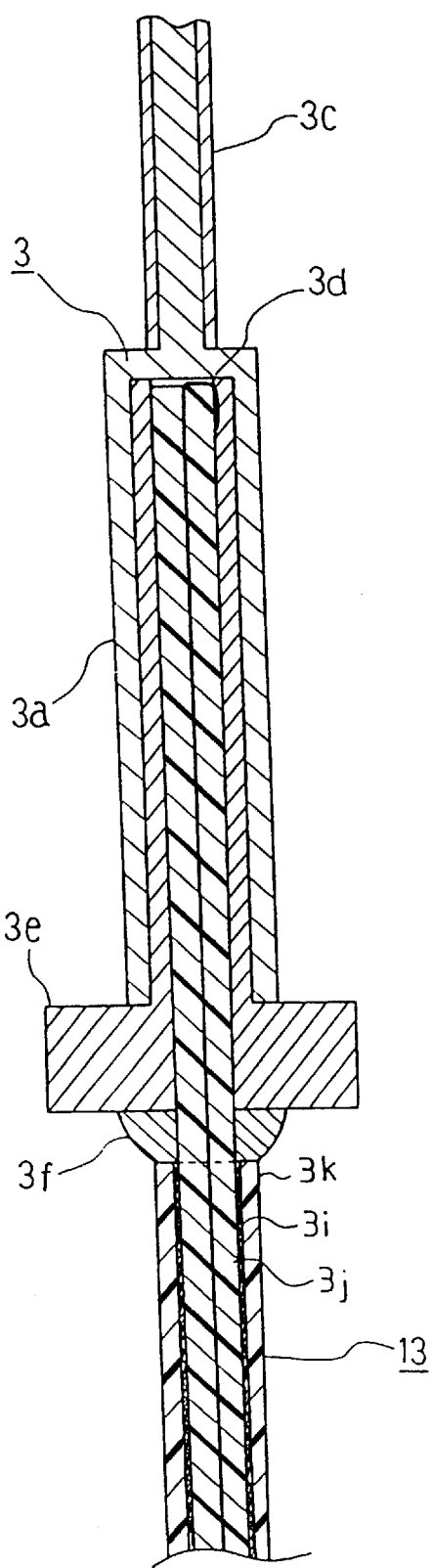
FIG. 6 shows a sectional side view of a connection terminal at a lower end of the antenna element of FIG. 2 illustrating a feed line.

FIG. 6 shows a detailed cross sectional partial view of the antenna element at the lower end.

Referring to the figure, coaxial line 13 has a center core line 3$d$ surrounded by an insulator 3$j$. The insulator 3$j$ is surrounded by a shield (ground) 3$i$. The shield is surrounded by an outer cover 3$k$ of the coaxial line 13. The antenna element 3 is connected at the lower end 3$a$ to the coaxial line 13 via a metal contact 3$e$. Consequently, a signal on the core line 3$d$ is transferred from the feed line side to the antenna element side via the metal contact 3$e$. The antenna element 3 is surrounded by an outer cover 3$c$. The coaxial line 13 is bonded with the metal contact 3$e$ by an adhesive 3$f$. The shield 3$i$ and the outer cover 3$k$ reach as far as the adhesive exists. The insulator 3$j$ and the core line 3$d$ are provided through the antenna element at the lower end via the metal contact 3$e$.

When the cylindrical antenna element 3 is pulled out, the stopper 16 blocks the connection terminal 3$a$ at the lower end of the antenna element to prevent the antenna element from coming out of the device. The physical contact between the stopper 16 and the connection terminal 3$a$ causes a frictional resistance, which holds the antenna element 3 in an extended position. The feed line 13 is fed out from the feed line storage compartment 14 as the antenna element 3 is pulled out of the device. In order to achieve optimal impedance matching of the antenna element 3, the connection terminal 3$a$ is brought into electrical contact with the coil 11 and the switch 12 through the connection terminal 5. The switch 12 detects the motion of the antenna element 3 mechanically or electrically. Depending on the direction of motion, the switch 12 comes into contact either with the open terminal or the ground terminal connected to the shield case 2 of the radio circuit 4. With the antenna element 3 in an extended state, for example, the switch 12 comes into contact with the ground terminal. Consequently, an impedance matching circuit is provided with a parallel inductance L, so that an antenna achieves an improved gain without any loss or deterioration caused by impedance mismatching. On the other hand, the feed line 13 is wound up in the feed line storage compartment 14 as the antenna element 3 is retracted for storage. The antenna element 3 in a stored state, keeping a fixed distance from a ground of the radio circuit 4, acts as a coaxial strip line. When the connection terminal 3$a$ at the lower end of the antenna element 3 hits the stopper 15 at a fixed position in a stored state, the connection terminal 3$b$ at the upper end of the antenna element is brought into electrical contact with the connection terminal 5. Concurrently, the switch 12, detecting mechanically or electrically the motion of the antenna element, comes into contact with an open terminal via the coil 11. Consequently, the coil 11 acts as a fixed helical antenna having an open upper end with the antenna element 3 in a stored state. This can achieve a high gain antenna with optimal impedance matching without a matching circuit, and therefore causing no matching circuit-related loss.

Figure 7:
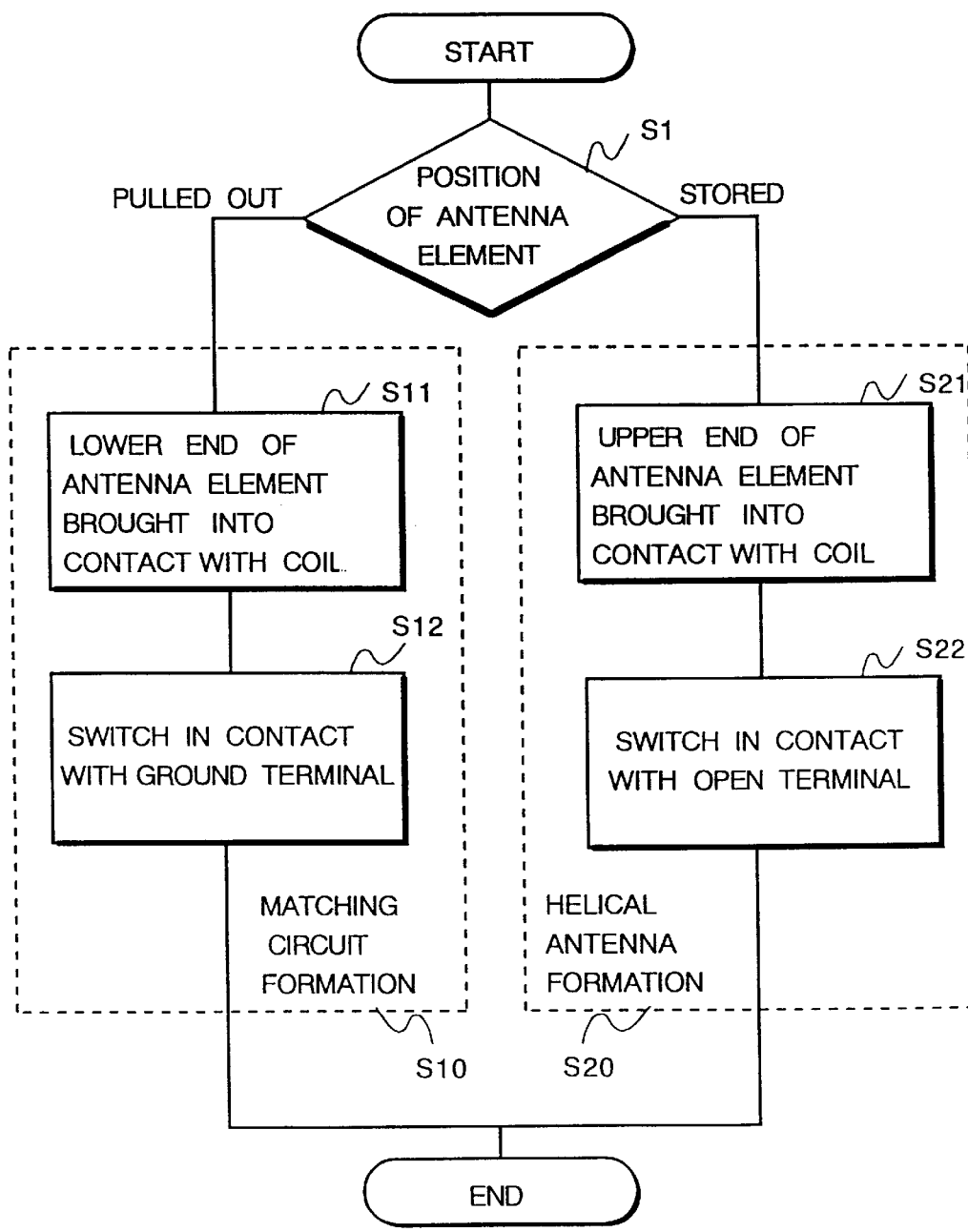
FIG. 7 shows a flowchart illustrating an operation of the antenna equipment of FIG. 2.

FIG. 7 is a flowchart of an operation of the antenna equipment.

Referring to the figure, there are respectively two choices of formations, a matching circuit formation S10 and a helical antenna formation S20, based on the motion of the antenna element 3 in step S1. When the antenna element 3 is pulled out in the step S1, the matching circuit formation S10 is selected and operation proceeds to step S1. The connection terminal 3a at the lower end of the antenna element is brought into contact with the coil 11 via terminal 5 in the step S1 and the switch 12 comes into contact with a ground terminal in step S12. This completes the matching circuit formation with the antenna element 3 in an extended state.

When the antenna element 3 is in a stored state in the step S1, the helical antenna formation S20 is selected and operation proceeds to step S21. The connection terminal 3b at the upper end of the antenna element is brought into contact with the coil 11 via terminal 5 in the step S21 and the switch 12 comes into contact with an open terminal in a step S22. This completes the helical antenna formation with the antenna element in a stored state.

According to this embodiment, the coil acts as a helical antenna with the antenna element 3 in a stored state. This requires no matching circuit to achieve optimal impedance matching with the antenna element providing a high gain antenna causing no matching circuit-related loss.

Embodiment 2

Figure 8:
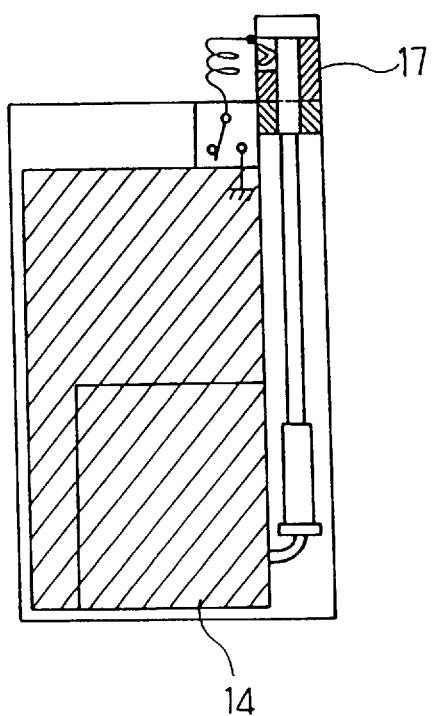
FIG. 8 shows a sectional side view of antenna equipment provided in a radio communication device with an antenna element in a stored state according to a second embodiment of the present invention.
Figure 9:
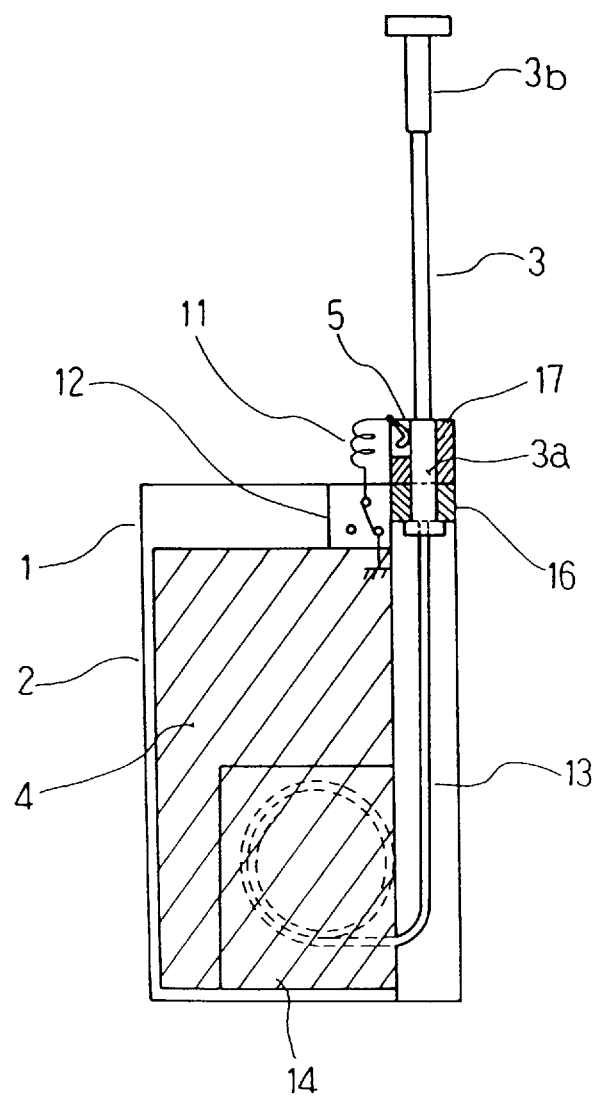
FIG. 9 shows a sectional side view of the antenna equipment of FIG. 8 with the antenna element in an extended state.

FIGS. 8 and 9 illustrate a stopper 17 provided outside the case 2 as a possible alternative of the stopper 15 of the first embodiment provided inside the case 2. The stopper 17 incorporates the connection terminal 5 within itself, whereby the connection terminal 5 is brought into contact with the connection terminal 3a at the lower end of the antenna element without possible failure.

According to this embodiment, the absence of the stopper 15 will allow the feed line to move smoothly in and out of the feed line storage compartment 14 with the antenna element as it is extended and retracted.

Embodiment 3

Figure 10:
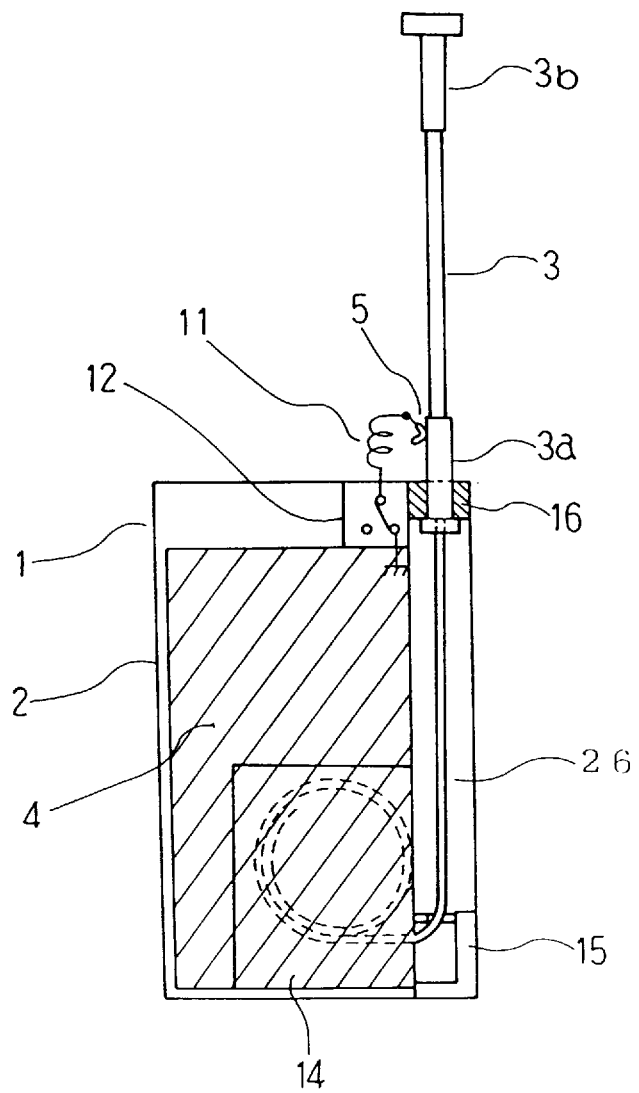
FIG. 10 shows a sectional side view of an antenna equipment provided in a radio communication device with an antenna element in an extended state according to a third embodiment of the present invention.
Figure 11:
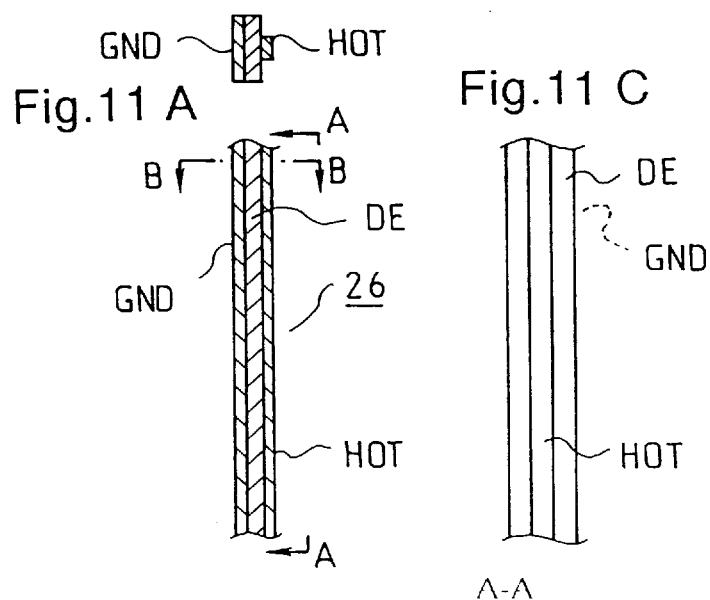
FIG. 11A shows a sectional side view of a feed line (a strip line) of the antenna equipment of FIG. 10.
FIG. 11B shows a B—B sectional front view of the feed line of FIG. 11A.
FIG. 11C shows an A—A sectional front view of the feed line of FIG. 11A.

FIGS. 10 through 11C illustrate a strip line 26 as a feed line as a possible replacement for the coaxial feed line 13.

The strip line has a dielectric (DE) substance inbetween a HOT (conductor) of a signal line and a GND (conductor).

The feed line storage compartment 14 is provided with a special device to assign a predetermined impedance to the feed line 26 in a stored state.

A thinner line can be provided for the feed line 26 than that of the coaxial feed line 13. This allows the feed line storage compartment 14 or the case 2 to be made smaller in breadth providing downsizing of the portable communication equipment.

Figure 12:
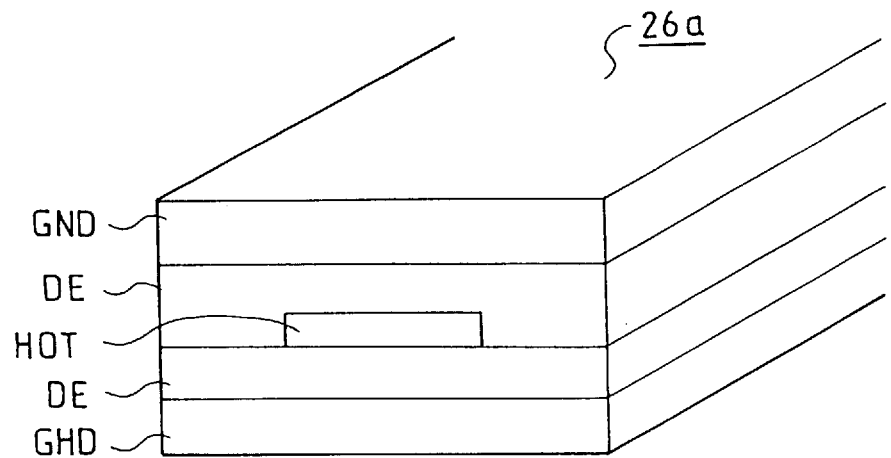
FIG. 12 shows a perspective sectional view of a replacement feed line for that of FIG. 10.

FIG. 12 illustrates a feed line 26a as a possible replacement for the feed line 26.

Figure 13:
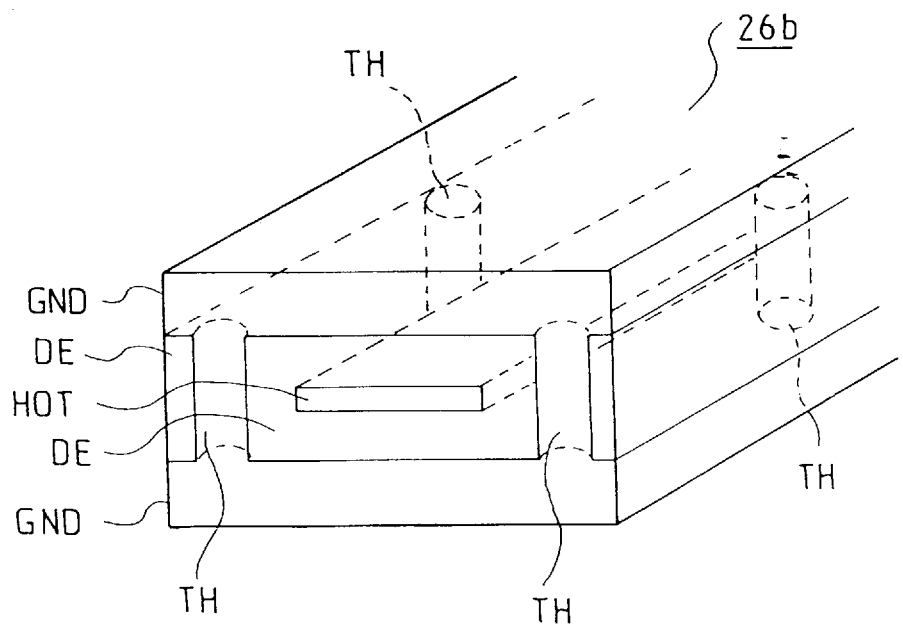
FIG. 13 shows another perspective sectional view of a replacement feed line for that of FIG. 10.

FIG. 13 illustrates a feed line 26b as a possible replacement for the feed line 26. The feed line 26b has two ground GND conductors connected together by way of through holes TH. A plurality of ground GND conductors connected together, as this example shows, by way of through holes TH effectively improves the ground function.

Embodiment 4

FIGS. 14A through 14C illustrate a triplet feed line 27 as a possible replacement for the coaxial feed line 13.

The triplet line has a HOT conductor buried in a the center of the dielectric (DE) substance with a GND conductor on the both sides.

A thinner line can be provided for the feed line 27 than that of the coaxial feed line 13. This allows the feed line storage compartment 14 or the case 2 to be made smaller in breadth thereby providing downsizing of the portable communication equipment.

Embodiment 5

FIGS. 15A through 15C illustrate a Lecher feed line 28 as a possible replacement for the coaxial feed line 13.

The Lecher line has a HOT conductor and GND conductor on the same side of a dielectric (DE) substance.

A thinner line can be provided for the feed line 28 than that of the feed lines 13, 26 and 27. This allows the feed line storage compartment 14 or the case 2 to be made smaller in breadth thereby providing downsizing of the portable communication equipment.

Figure 16:
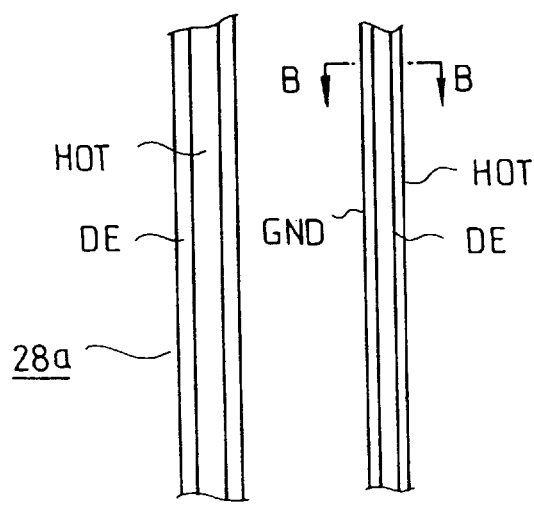
FIG. 16A shows a front view of a replacement feed line for that of FIG. 15A according to the fifth embodiment.
FIG. 16B shows a side view of the feed line of FIG.
FIG. 16C shows a B—B sectional view of the feed line of FIG. 16C.

FIGS. 16A through 16C illustrate a twin wire feed line 28a as another possible replacement for the coaxial feed line 13. The twin wire feed line 28a is provided with two parallel lines of a HOT conductor on one side and a GND conductor on the other side of a dielectric (DE) substance.

Embodiment 6

Figure 17:
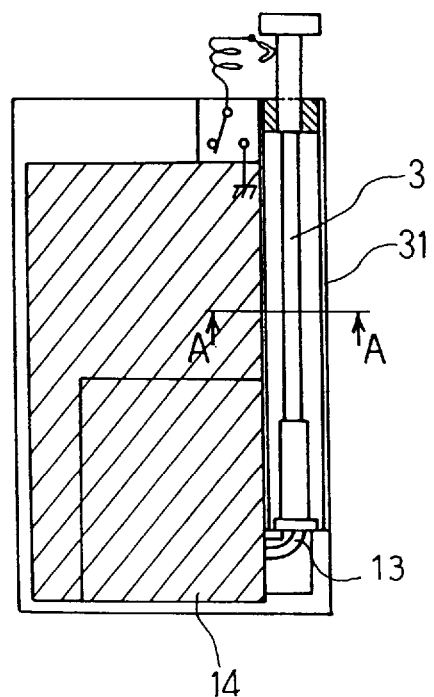
FIG. 17 shows a sectional side view of antenna equipment provided in a radio communication device with an antenna element in a stored state according to a sixth embodiment of the present invention.
Figure 18:
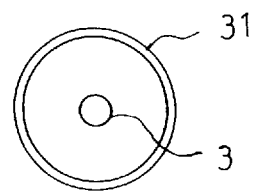
FIG. 18 shows an A—A sectional view of the antenna element, illustrating a feed line, of the antenna equipment of FIG. 17.

FIGS. 17 and 18 illustrate a coaxial line as a possible replacement for the coaxial strip line discussed in the first embodiment. The antenna element 3 can be a coaxial strip line in a stored state with a fixed distance kept from the radio circuit 4 in the first embodiment. In this embodiment, however, the antenna element 3 can be a coaxial line with a circular metal cylinder 31 for grounding provided around the antenna element in a stored state.

The circular metal cylinder 31 is brought into contact with a metallic outer shield (ground GND) of the radio circuit 4 in a stored state of the antenna element 3. Consequently, the circular metal cylinder 31 becomes an outer conductor GND of the coaxial line. The antenna element 3 works as an inner conductor.

The coaxial line replaced for the strip line of the first embodiment can reduce leakage loss, which can provide a high gain antenna with the antenna element 3 in a stored state.

Embodiment 7

Figure 19:
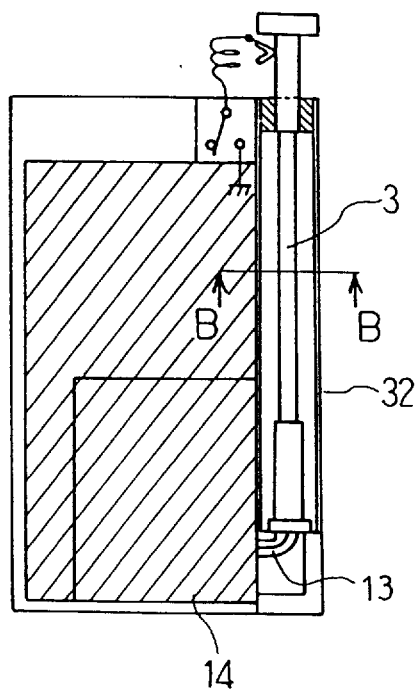
FIG. 19 shows a sectional side view of antenna equipment provided in a radio communication device with an antenna element in a stored state according to a seventh embodiment of the present invention.
Figure 20:
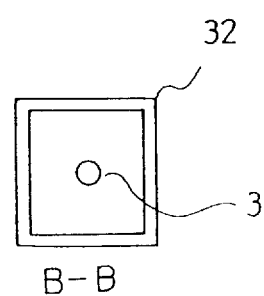
FIG. 20 shows a B—B sectional view of the antenna element, illustrating a feed line, of the antenna equipment of FIG. 19.

FIGS. 19 and 20 illustrate another coaxial line as a possible replacement for the coaxial strip line discussed in the first embodiment. The antenna element 3 can be a coaxial strip line in a stored state with a fixed distance kept from the radio circuit 4 in the first embodiment. In this embodiment, however, the antenna element 3 can be a coaxial line with a rectangular metal cylinder 32 for grounding provided around the antenna element 3 in a stored state.

The rectangular metal cylinder 32 is brought into contact with a metallic outer shield (ground GND) of the radio circuit 4 in a stored state of the antenna element 3. Consequently, the circular metal cylinder 31 becomes an outer conductor [GND] of the coaxial line. The antenna element 3 works as an inner conductor.

The seventh embodiment effects the same performance as that of the sixth embodiment. The outside diameter of the antenna element 3 is selected based on an optimal impedance. A single type of metal in thickness can be used commonly for producing the rectangular metal cylinder 32 and the radio circuit 4. An antenna equipment of this embodiment can be provided at a lower cost than that of the fifth embodiment.

Embodiment 8

Figure 21:
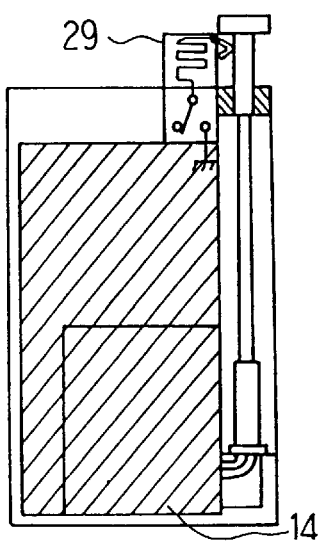
FIG. 21 shows a sectional side view of an antenna equipment provided in a radio communication device with an antenna element in a stored state according to an eighth embodiment of the present invention.
Figure 22:
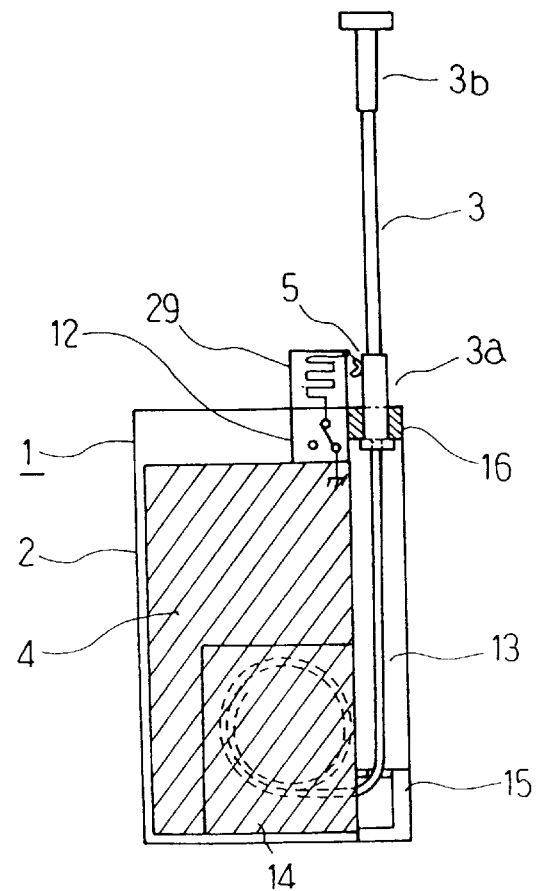
FIG. 22 shows a sectional side view of the antenna equipment of FIG. 21 with the antenna element in an extended state.

Referring to the first embodiment, the coil 11 is used as a matching circuit in an extended state of the antenna element 3 as well as an active antenna element in a stored state. FIGS. 21 and 22 illustrate a meander board 29 as a possible replacement for the coil 11.

The meander board 29 has a pattern L (inductance L) mounted on a board.

The meander board 29 can provide an improved etching of the conductor pattern L on the board resulting in less variation of inductance L than the coil. This can provide a high gain antenna, and improve the Voltage Standing Wave Ratio VSWR.

Embodiment 9

Figure 23:
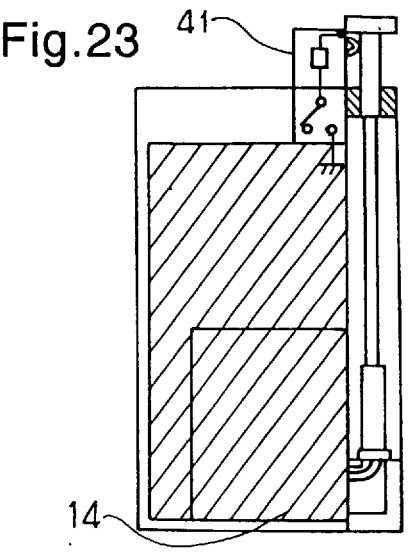
FIG. 23 shows a sectional side view of antenna equipment provided in a radio communication device with an antenna element in a stored state according to a ninth embodiment of the present invention.
Figure 24:
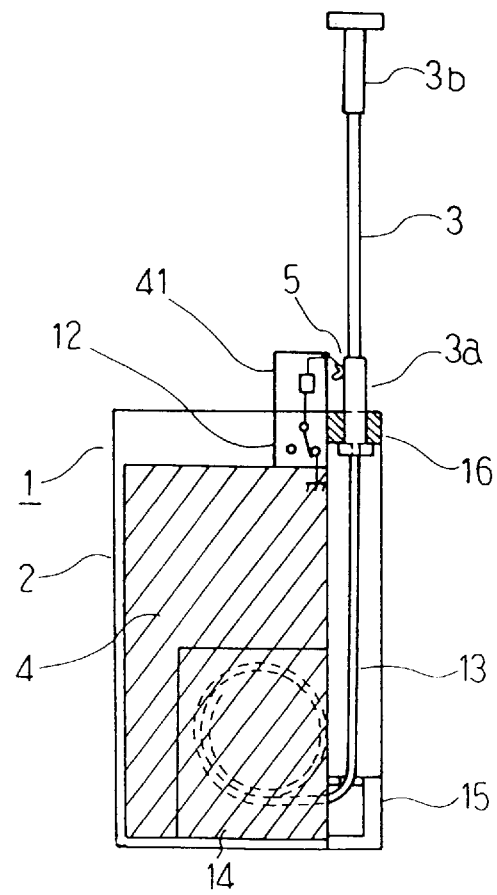
FIG. 24 shows a sectional side view of the antenna equipment of FIG. 23 with the antenna element in an extended state.

Referring to the first embodiment, the coil 11 is used as a matching circuit in an extended state of the antenna element 3 as well as an active antenna element in a stored state. FIGS. 23 and 24 illustrate a commercial chip L 41 as a possible replacement for the coil 11.

The chip L 41 is a chip inductor provided for SMD (surface-mounted device) electronic parts. The chip L is developed by a Joint technology of a ferritic material art and a greensheet multi-layer wiring art. The chip L, unlike a conventional coil winding inductor, is a ferritic product formed into a greensheet based on highly reliable advanced technologies. The ferritic greensheet type material has a conductor of small sheet resistance printed on it. A layers of the conductor printed greensheet type ferritic materials is united into a multilayer entity by a via hole technique and fired for a finishing.

According to this embodiment, the antenna equipment employing the commercial chip L 41 can be provided smaller in size and provided at a lower cost.

Embodiment 10

Figure 25:
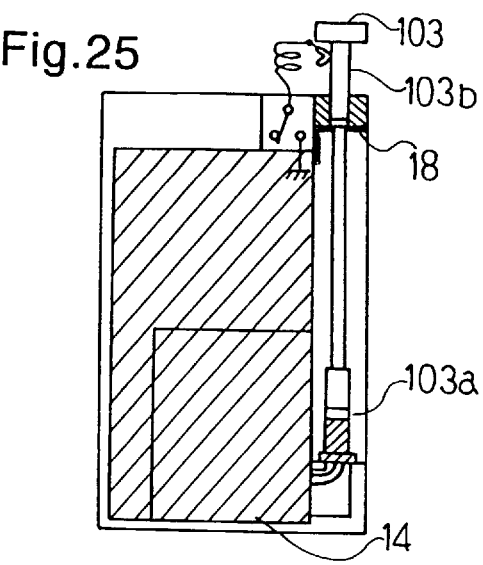
FIG. 25 shows a sectional side view of antenna equipment provided in a radio communication device with an antenna element in a stored state according to a tenth embodiment of the present invention.
Figure 26:
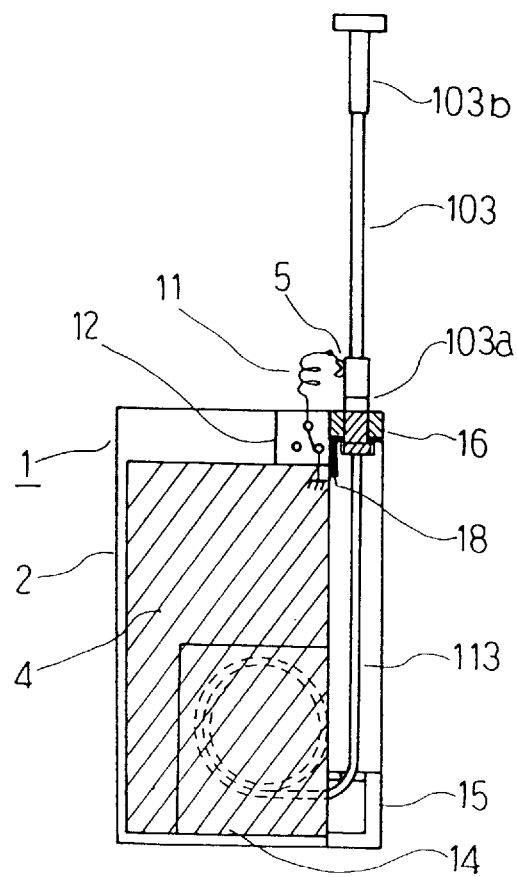
FIG. 26 shows a sectional side view of the antenna equipment of FIG. 25 with the antenna element in an extended state.
Figure 27:
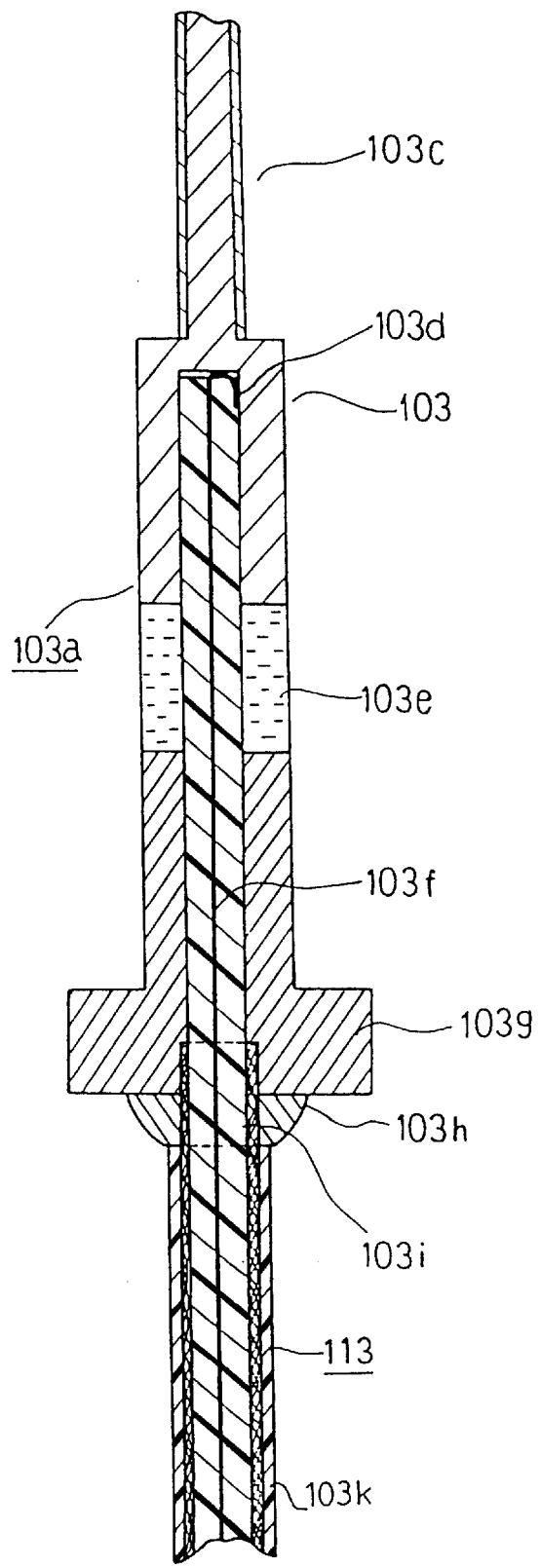
FIG. 27 shows a sectional side view of a connection terminal at a lower end of the antenna element, illustrating a feed line, of the antenna equipment of FIG. 25.

FIGS. 25 through 27 illustrate a connection terminal 103a at the lower end of the antenna element 103 as a possible replacement for the connection terminal 3a. The connection terminal 3a at the lower end of the antenna element is made of all metal in the first embodiment. The connection terminal 103a of this embodiment, however, has an insulator 103e in the center between two metal contacts. A metal contact 103g at a lower end of the connection terminal 103a is connected to a shield 103i of a feed line 113 by soldering. An L shaped sheet metal 18 touching the radio circuit 4 is adhered at the bottom part of the stopper 16. Consequently, the metal contact 103g is brought into contact with a ground of the radio circuit 4 when it touches the L shaped sheet metal 18.

Thus, an unstable electric factor with a shield is removed at the upper end of the feed line 113 by shorting. This can improve the electrical performance of the antenna element 103 in an extended state.

A connection terminal 103b at the upper end of the antenna element is designed in size to avoid a short in contact with the L shaped sheet metal 18 with the antenna element 103 in a stored state.

Referring to the first embodiment, the coaxial feed line 13 is open edged. In this case, there is possible radiation from the feed line 13 when an electric potential difference occurs between the feed line and the metallic outer shield of the radio circuit 4 in an extended state of the antenna element 3. The antenna element 3 also radiates. This may result in poor gain performance with the antenna element in an extended state. According to this embodiment, on the other hand, the open edged shield 103i of the feed line (a coaxial line) 113 is soldered with the metal contact 103g of the connection terminal 103a at the lower end of the antenna element. The connection terminal 103a at the lower end of the antenna element in an extended state is brought into contact with the L shaped sheet metal 18 touching the radio circuit 4. A shield contact 103i of the open edged feed line 113 and the outer metal of the radio circuit 4 gives an equipotential environment of electric difference. This results in no unwanted radiation from the coaxial line 113 providing a high gain antenna with the antenna element in an extended state.

According to this embodiment, the shield of the connection terminal of the feed line connected to the connecting terminal at the lower end of the antenna element is brought to a forced short in an extended state of the antenna element 3. This can eliminate unwanted radiation and reduce loss caused by feed line insertion or feed line insertion loss providing a high gain antenna.

Embodiment 11

Figure 28:
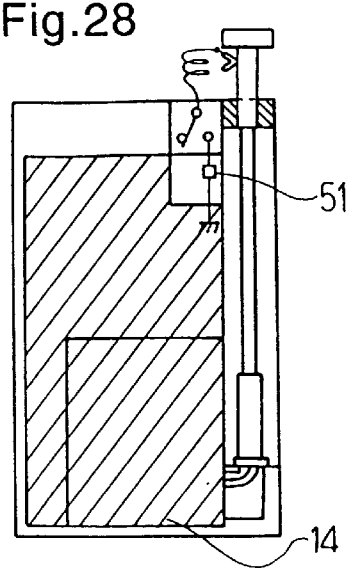
FIG. 28 shows a sectional side view of antenna equipment provided in a radio communication device with an antenna element in a stored state according to an eleventh embodiment of the present invention.
Figure 29:
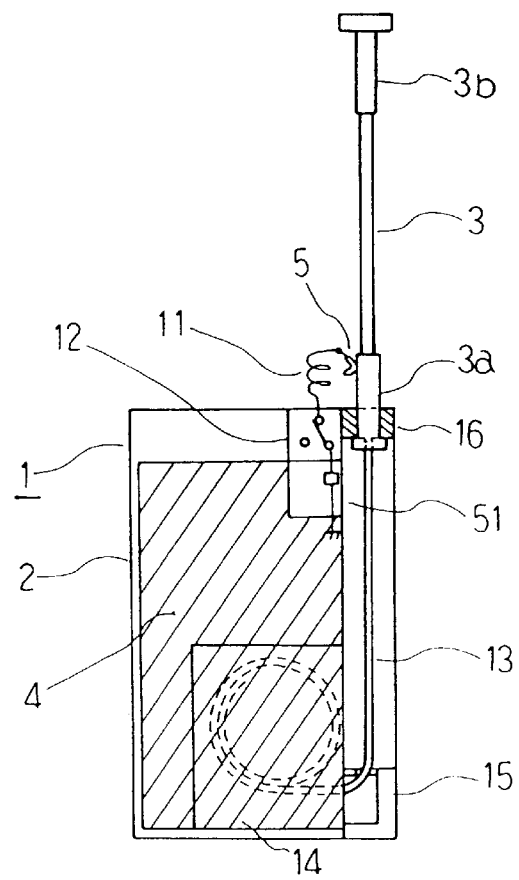
FIG. 29 shows a sectional side view of the antenna equipment of FIG. 28 with the antenna element in an extended state.

A chip element 51 (chip L or/and chip C) illustrated in FIGS. 28 and 29 can be used for fine tuning the impedance matching of the coil 11 as a matching element in an extended state of the antenna element 3 discussed in the first embodiment.

The chip C (condenser) 51 has a large capacitance based on an advanced thin film technology of ceramic dielectric layer and a multilayer monolithic technology. The chip C is strong in static and mechanical characteristics because of the solid monolithic structure. Because of its precise designing in dimensions, the chip C is efficient in handling in an automated mounting process. Because of its composition materials only of ceramic and metal, the chip C is efficient in a heat-resistant stable quality and rarely deteriorates in any temperature environment. Because of the characteristic of the monolithic structure and the composition materials, the chip is environmentally highly reliable. Because of the reversible structure and nonpolar nature, the mounting process of the chip can be simplified. Because of its lead wireless structure with a small stray capacitor, the chip can be provided with an ideal circuit design based on theoretical values. Consequently, an antenna can be provided with little residual inductance and an improved frequency characteristic.

The chip element 51 can be employed to correct possible variation of inductance of the coil 11 affected by the outside metal shield (ground GND) of the radio circuit 4.

Variation of inductance of the coil 11 can cause an inductance mismatching in an extended state of the antenna element 3 leading to a deteriorated Voltage Standing Wave Ratio VSWR and an increase in reflection loss. The chip element 51 can improve a Voltage Standing Wave Ratio VSWR and reduce reflection loss providing a high gain antenna.

Embodiment 12

Figure 30:
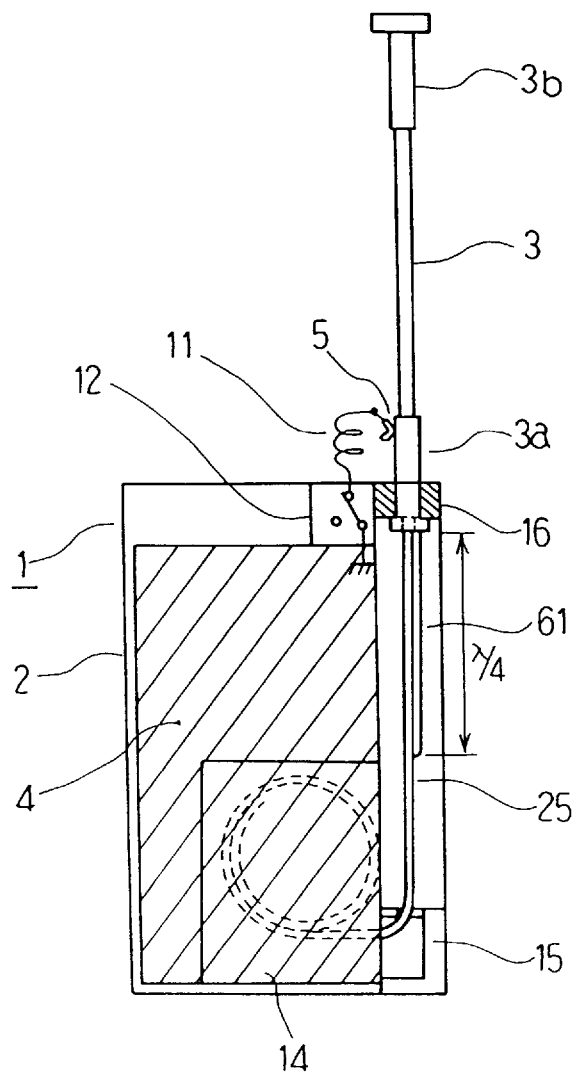
FIG. 30 shows a sectional side view of antenna equipment provided in a radio communication device with an antenna element in an extended state according to a twelfth embodiment of the present invention.
Figure 31:
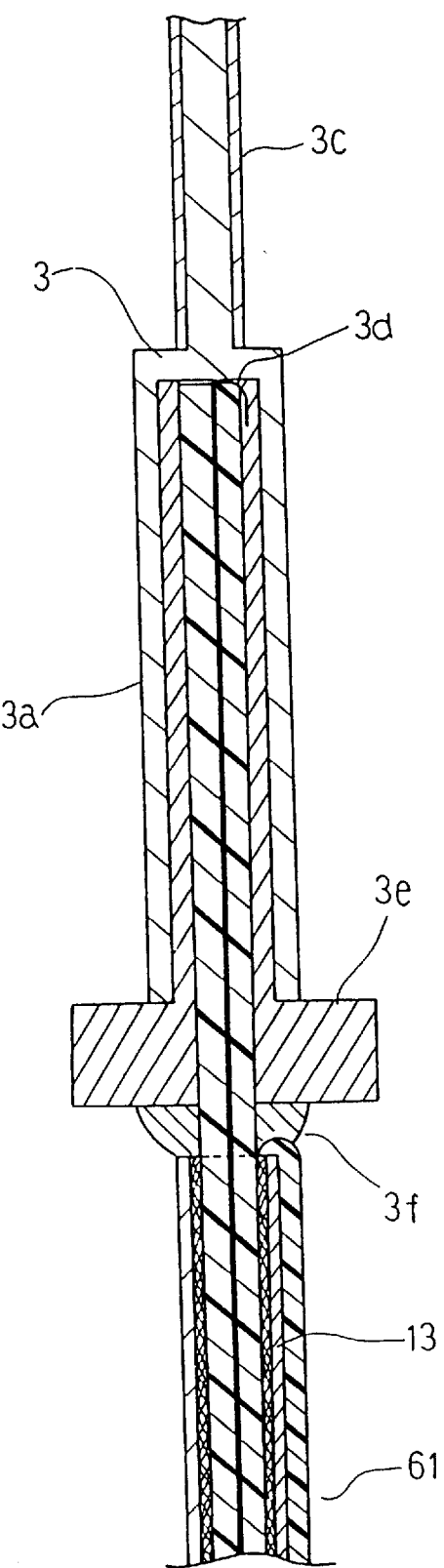
FIG. 31 shows a sectional side view of a connection terminal at a lower end of the antenna element, illustrating a feed line, of the antenna equipment of FIG. 30.

Referring to the first embodiment, an open ended shield at the connection is used with the coaxial feed line 13 connected to the connection terminal 3a at the lower end of the antenna element. FIGS. 30 and 31 illustrate a feed line provided with a λ/4 choke line 61. λ is the wavelength of a signal transmitted by the antenna. The λ/4 choke line 61 shorts the open ended shield and improves the electric performance of the antenna element 3.

Embodiment 13

Figure 32:
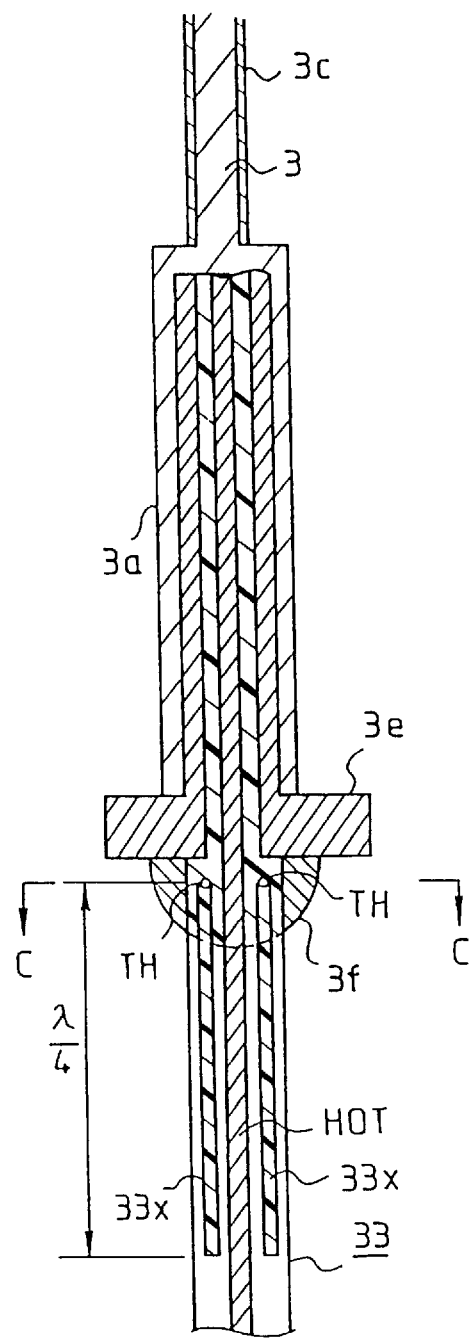
FIG. 32 shows a sectional side view of a connection terminal at a lower end of an antenna element, illustrating a feed line, of antenna equipment according to a thirteenth embodiment of the present invention.
Figure 33:
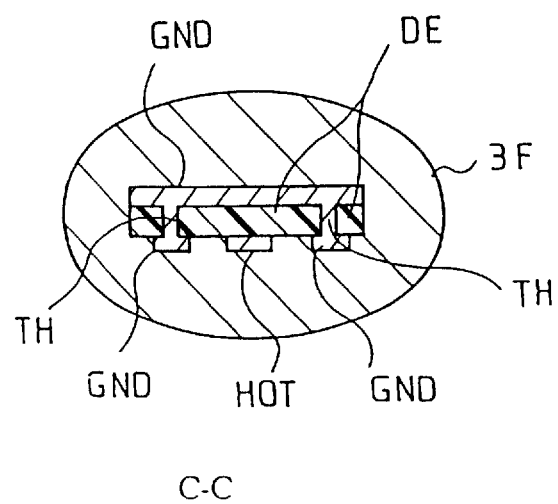
FIG. 33 shows a C—C sectional view of the feed line of the antenna equipment in FIG. 32.

FIGS. 32 and 33 illustrate a λ/4 choke strip line 33 as a feed line as a possible replacement for the λ/4 choke coaxial feed line discussed in the twelfth embodiment. The λ/4 choke strip line 33 includes λ/4 choke lines 33x and through holes TH. The λ/4 choke lines 33x reach a GND via the through holes TH.

The λ/4 choke strip line 33 works as a sleeve antenna with the antenna element of a λ/4 in length and effects the same performance as that of the twelfth embodiment.

FIGS. 32 and 33 illustrate the λ/4 choke strip line 33 with the λ/4 choke lines 33x. The λ/4 choke lines 33x can help to short an open ended shield of the feed line 33 connected to the connection terminal 3a at the lower end of the antenna element. This results in preventing unwanted radiation from the λ/4 choke strip line 33 leading to the improved electrical performance of the antenna element 3.

Thus, the λ/4 choke lines 33x are provided for shorting the open ended shield of the feed line with the antenna element in an extended state. This can eliminate unwanted radiation and reduce feed line insertion loss providing a high gain antenna.

Embodiment 14

Figure 34:
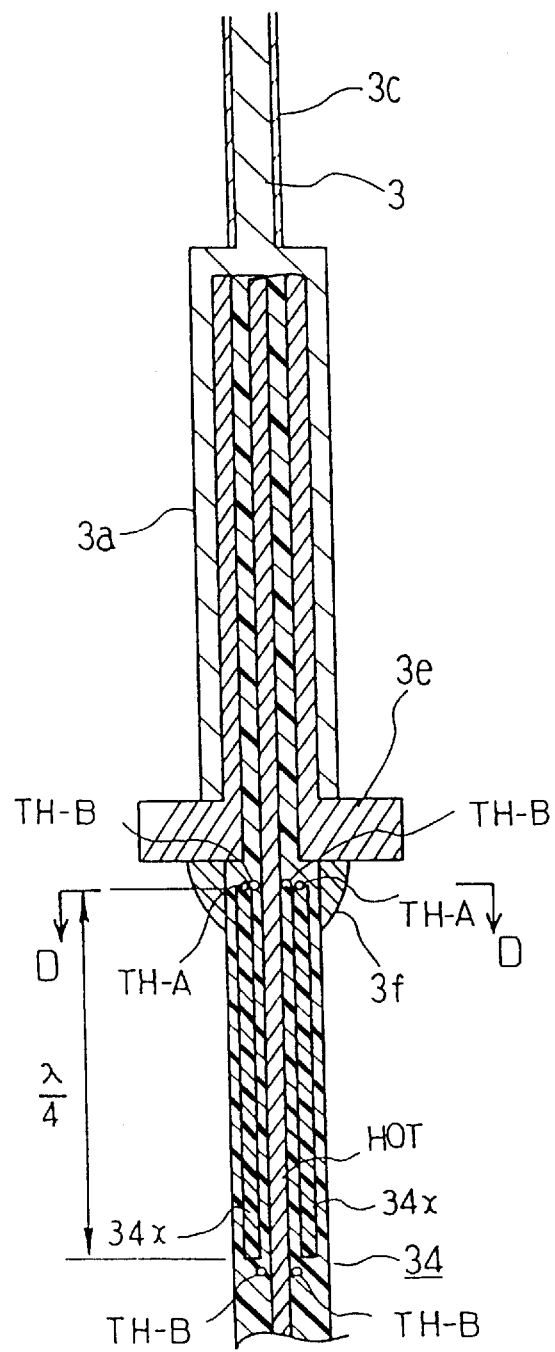
FIG. 34 shows a sectional side view of a connection terminal at a lower end of an antenna element, illustrating a feed line, of antenna equipment according to a fourteenth embodiment of the present invention.
Figure 35:
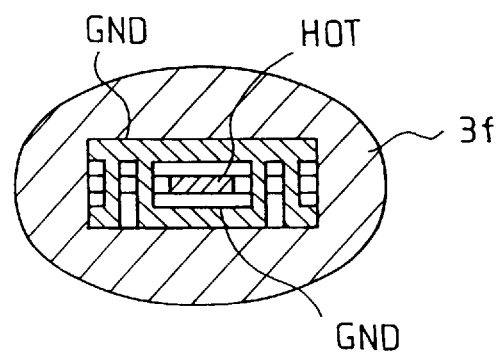
FIG. 35 shows a D—D sectional view of the feed line of the antenna equipment of FIG. 34.

FIGS. 34 and 35 illustrate a λ/4 choke triplet line 34 as a feed line as a possible replacement for the λ/4 choke coaxial feed line connected to the connection terminal 3a discussed in the twelfth embodiment. The λ/4 choke triplet line 34 includes λ/4 choke lines 34x and through holes TH-A and TH-B. The λ/4 choke triplet line 34 effects the same performance as that of the twelfth embodiment. The λ/4 choke lines 34x reach a GND on via the through holes TH-A. The through holes TH-B connect grounds GND on the both sides, which provides an efficient ground function.

FIGS. 34 and 35 illustrate the λ/4 choke triplet line 34 with the λ/4 choke lines 34x. The λ/4 choke lines 34x can help to short an open ended shield of the feed line 34 connected to the connection terminal 3a at the lower end of the antenna element. This results in preventing unwanted radiation from the λ/4 choke triplet line 34 providing improved electric performance of the antenna element 3.

Figure 36:
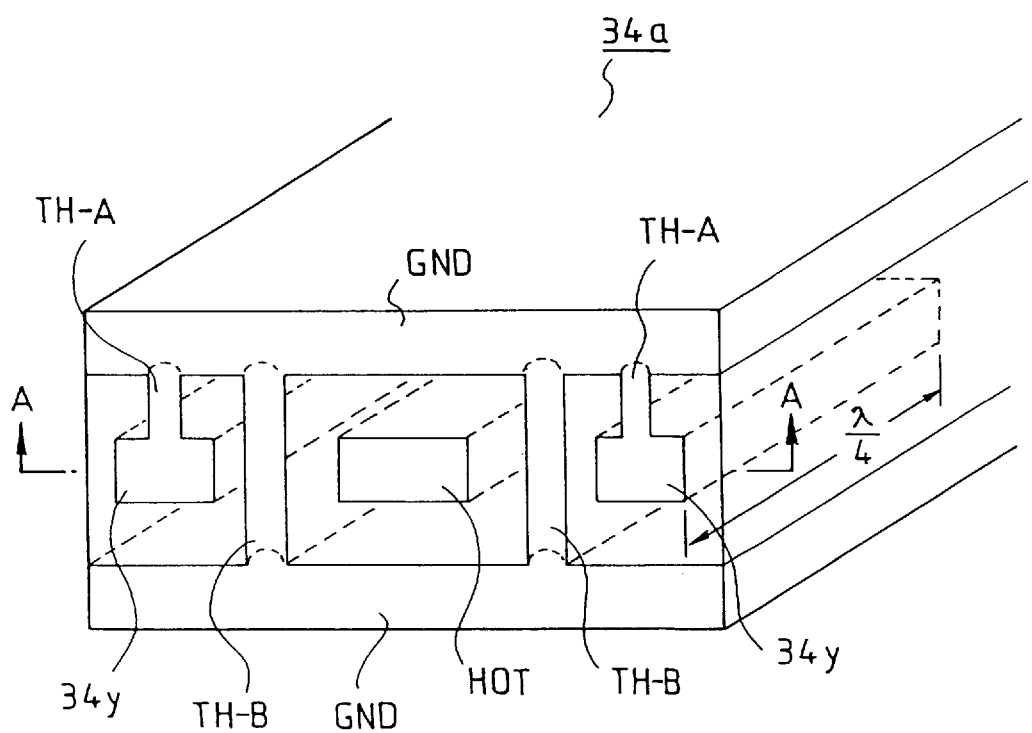
FIG. 36 shows a perspective sectional view of a replacement feed line for that of FIG. 34 according to the fourteenth embodiment.

FIG. 36 illustrates a λ/4 choke feed line 34a as a possible replacement for the previous feed lines. The λ/4 choke feed line 34a includes λ/4 choke feed lines 34y and through holes TH-A and TH-B. Referring to the figure, the λ/4 choke lines 34y reach a GND via the through holes TH-A. The through holes TH-B connect two grounds GND on the both sides.

Figure 37:
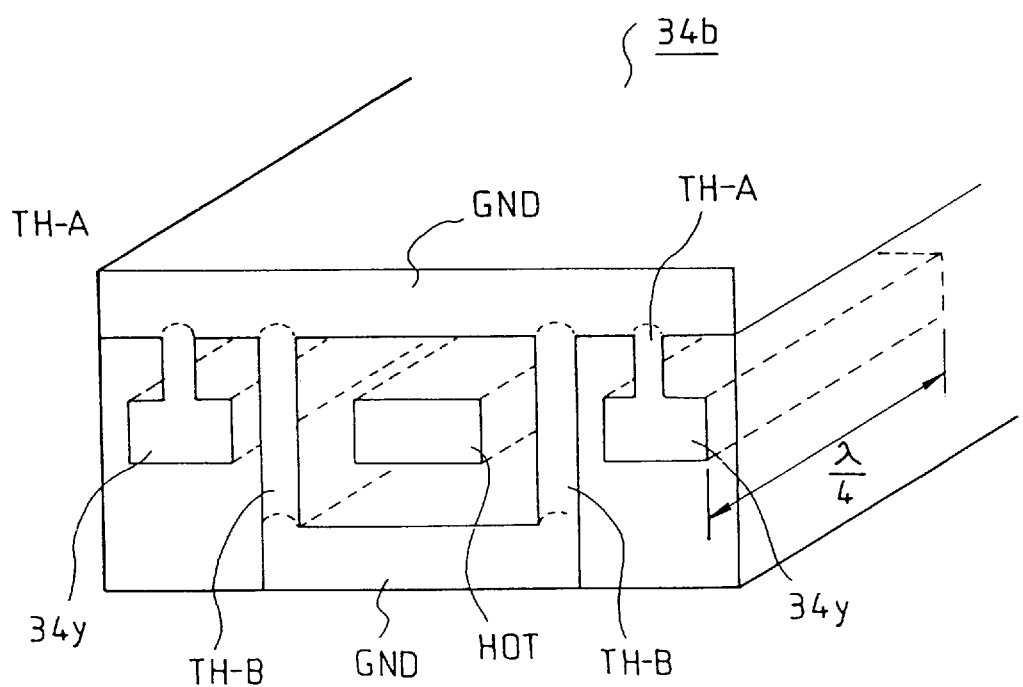
FIG. 37 shows a perspective sectional view of another replacement feed line for that of FIG. 34 according to the fourteenth embodiment.
Figure 38:
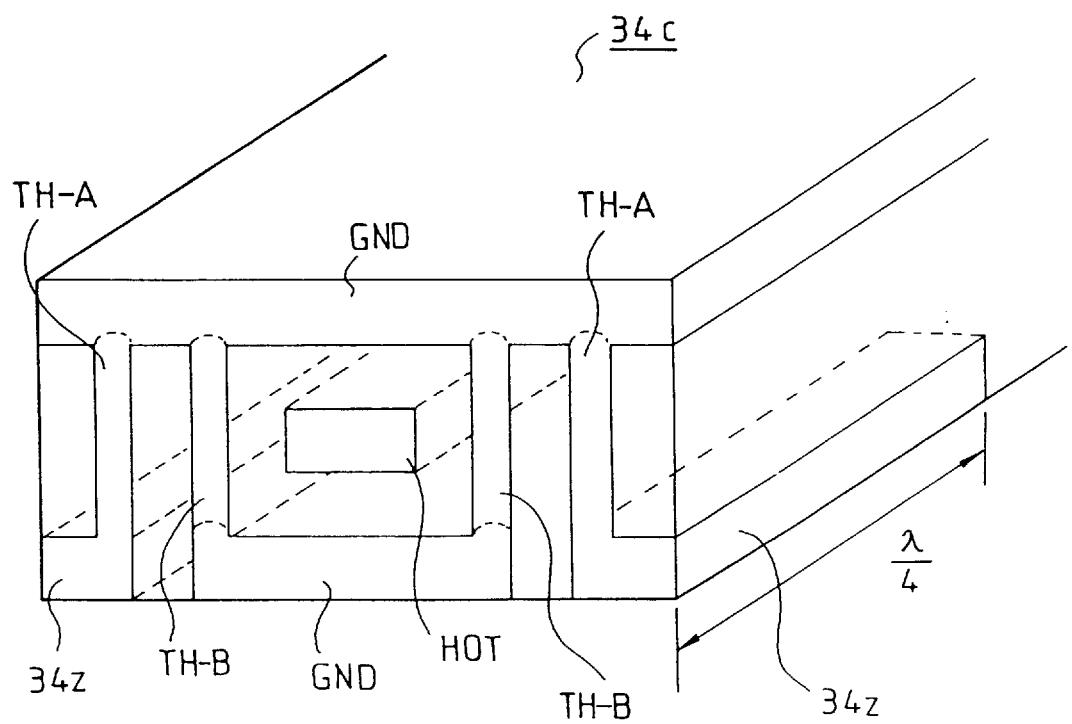
FIG. 38 shows a perspective sectional view of another replacement feed line for that of FIG. 34 according to the fourteenth embodiment.

FIGS. 37 and 38 illustrate other possible replacements for the previous feed lines. FIG. 37 shows a λ/4 choke feed line 34b with λ/4 choke lines 34y. FIG. 38 shows a λ/4 choke feed line 34c with λ/4 choke lines 34z.

Thus, the λ/4 choke lines 34x, 34y and 34z are provided for shorting the open ended shield of the feed line with the antenna element in an extended state. This can eliminate unwanted radiation and reduce feed line insertion loss providing a high gain antenna.

Embodiment 15

Figure 39:
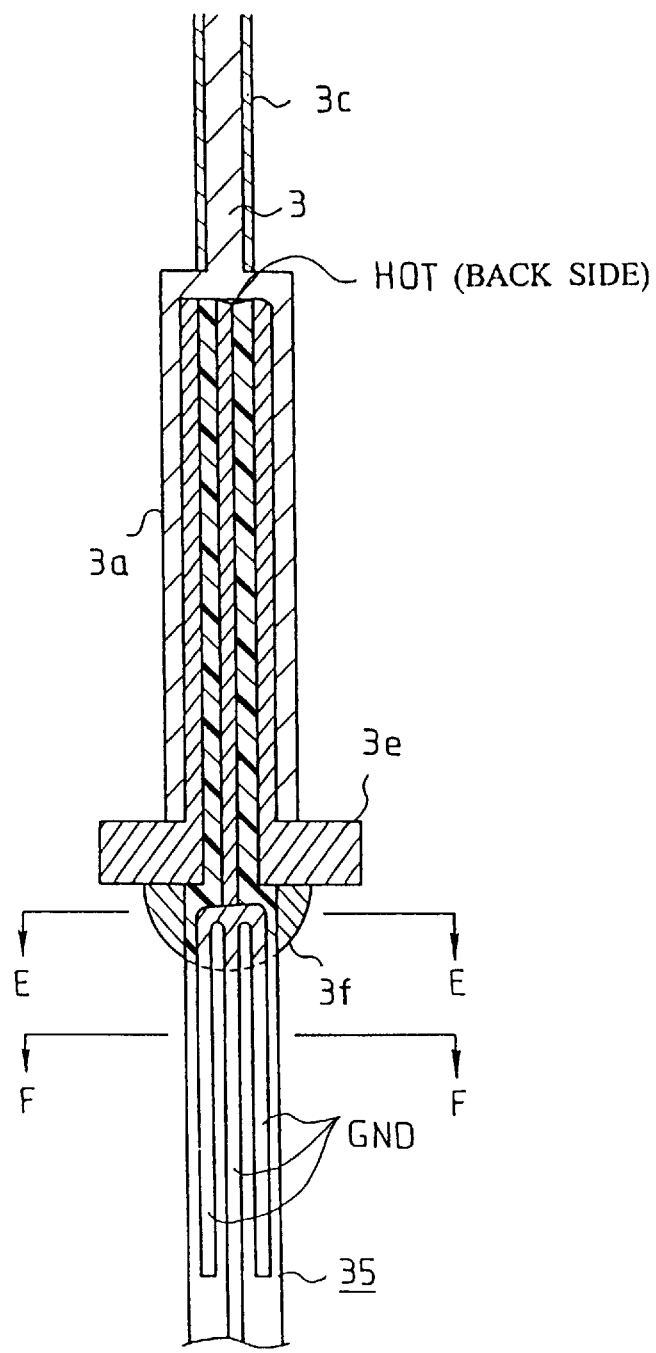
FIG. 39 shows a sectional side view of a connection terminal at a lower end of an antenna element, illustrating a feed line, of antenna equipment according to a fifteenth embodiment of the present invention.
Figure 40:
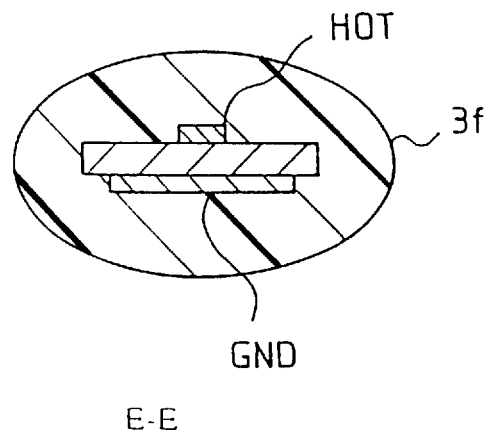
FIG. 40 shows an E—E sectional view of the feed line of the antenna equipment of FIG. 39.
Figure 41:
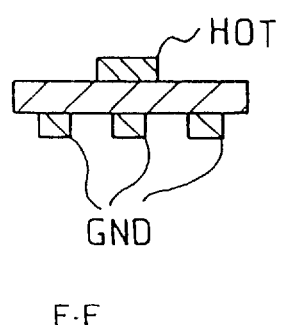
FIG. 41 shows an F—F sectional view of the feed line of the antenna equipment of FIG. 39.

FIGS. 39, 40 and 41 illustrate a λ/4 choke twin wire feed line 35 as a possible replacement for the λ/4 choke coaxial feed line discussed in the twelfth embodiment. The λ/4 choke twin wire feed line 35 effects the same performance as that of the twelfth embodiment.

FIGS. 39, 40 and 41 illustrate the λ/4 choke twin wire feed line 35 with λ/4 choke lines. The λ/4 choke lines can help to short an open ended shield of the feed line 35 connected to the connection terminal 3a at the lower end of the antenna element. This results in preventing unwanted radiation from the λ/4 choke twin wire feed line 35 leading to improved electric performance of the antenna element 3.

Thus, the λ/4 choke lines are provided for shorting the open ended shield of the feed line with the antenna element in an extended state. This can eliminate unwanted radiation and reduce feed line insertion loss providing a high gain antenna.

Figure 42:
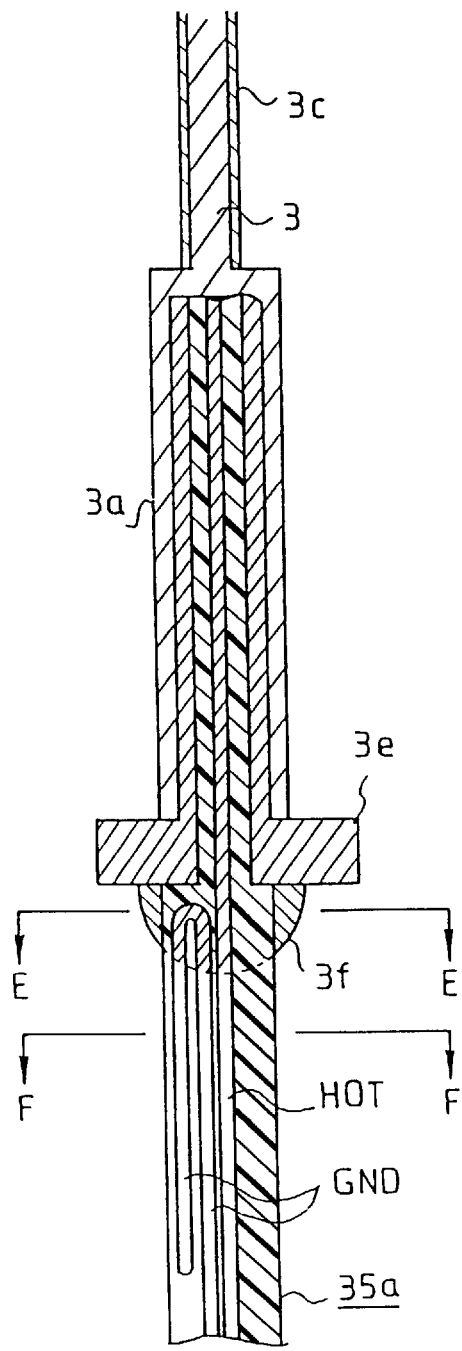
FIG. 42 shows a sectional side view of a connection terminal at a lower end of an antenna element, illustrating another feed line, of antenna equipment according to the fifteenth embodiment of the present invention.
Figure 43:
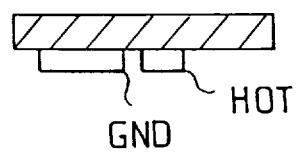
FIG. 43 shows an E—E sectional view of the feed line of the antenna equipment of FIG. 42.
Figure 44:
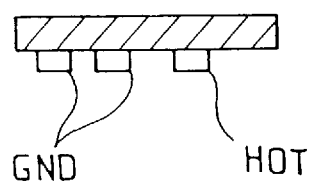
FIG. 44 shows an F—F sectional view of the feed line of the antenna equipment of FIG. 42.

FIGS. 42, 43 and 44 illustrate a λ/4 choke Lecher line 35a as a feed line as a possible replacement for the previous feed lines.

Embodiment 16

Figure 45:
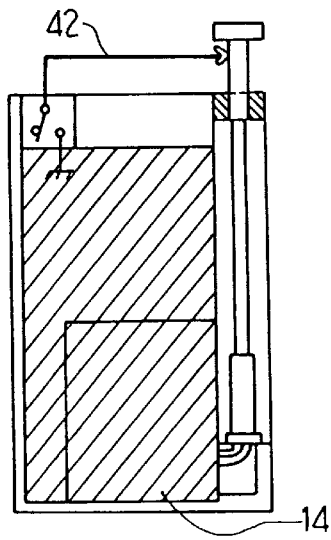
FIG. 45 shows a sectional side view of antenna equipment provided in a radio communication device with an antenna element in a stored state according to a sixteenth embodiment of the present invention.
Figure 46:
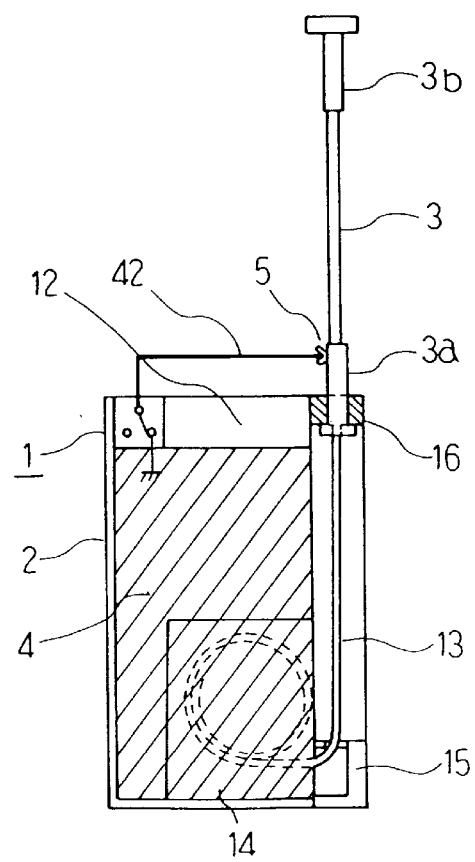
FIG. 46 shows a sectional side view of the antenna equipment of FIG. 45 with the antenna element in an extended state.

FIGS. 45 and 46 illustrate a line element 42 as a possible replacement for the coil 11 discussed in the first embodiment. The coil 11 works as a matching element with the antenna element in an extended state and as an active antenna element in a stored state. On the other hand, the line element 42 can work as a reverse L line antenna with the antenna element 3 in a stored state.

According to this embodiment, the line element 42 can be used with the antenna element 3 as a matching element in an extended state and as a reverse L line antenna in a stored state. Consequently, the antenna equipment can be provided at a lower cost with a small and light body in size and weight.

Embodiment 17

Figure 47:
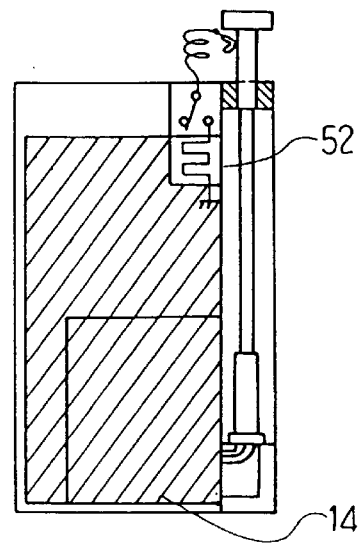
FIG. 47 shows a sectional side view of antenna equipment provided in a radio communication device with an antenna element in a stored state according to a seventeenth embodiment of the present invention.
Figure 48:
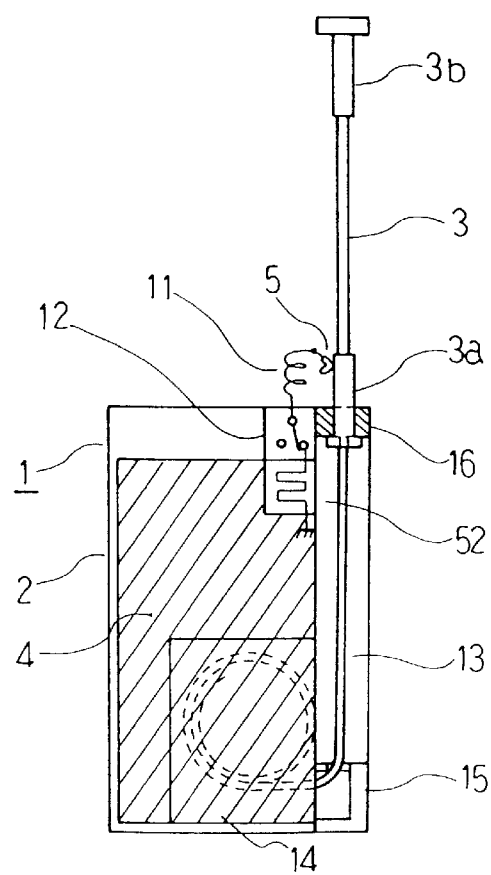
FIG. 48 shows a sectional side view of the antenna equipment of FIG. 47 with the antenna element in an extended state.

FIGS. 47 and 48 illustrate a pattern L 52 on a board for fine tuning the impedance matching with the antenna element in an extended state as a possible replacement for the coil 11 as a matching element discussed in the first embodiment.

The pattern L 52 can be applied to the eleventh embodiment if there is a limitation on the size of the coil. The pattern L 52 can realize antenna equipment with a thinner and smaller body.

Embodiment 18

Figure 49:
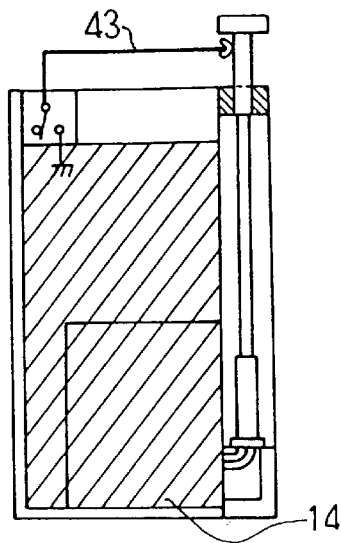
FIG. 49 shows a sectional side view of antenna equipment provided in a radio communication device with an antenna element in a stored state according to an eighteenth embodiment of the present invention.
Figure 50:
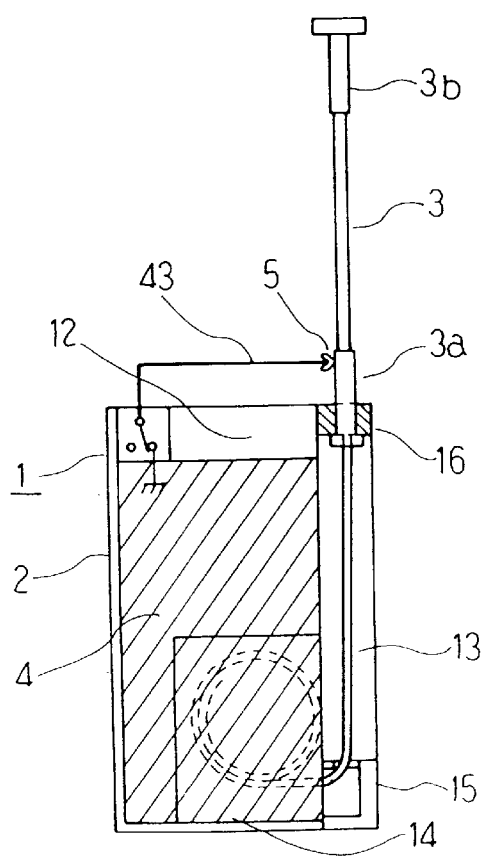
FIG. 50 shows a sectional side view of the antenna equipment of FIG. 49 with the antenna element in an extended state.
Figure 51:
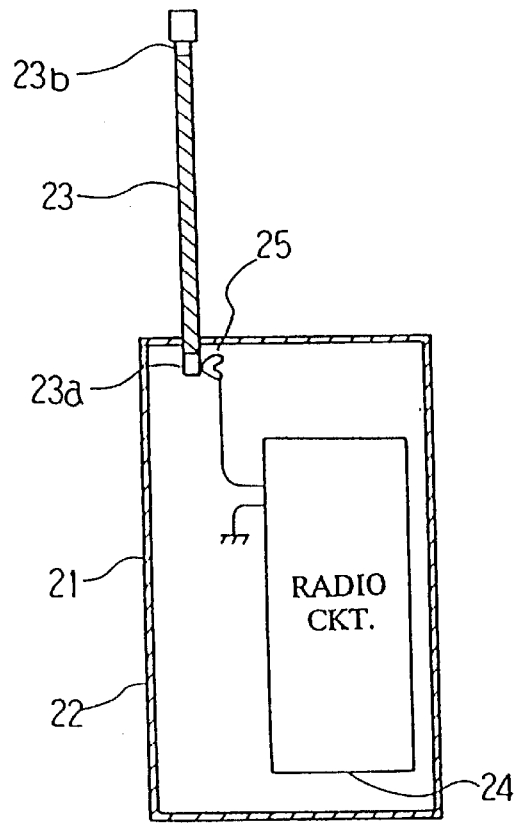
FIG. 51 shows a sectional side view of conventional antenna equipment provided in a conventional radio communication device with an antenna element in an extended state.
Figure 52:
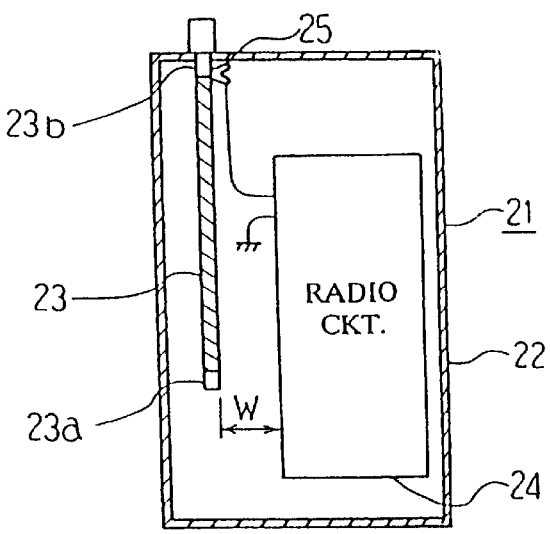
FIG. 52 shows a sectional side view of the conventional antenna equipment of FIG. 51 with the antenna element in a stored state.
Figure 53:
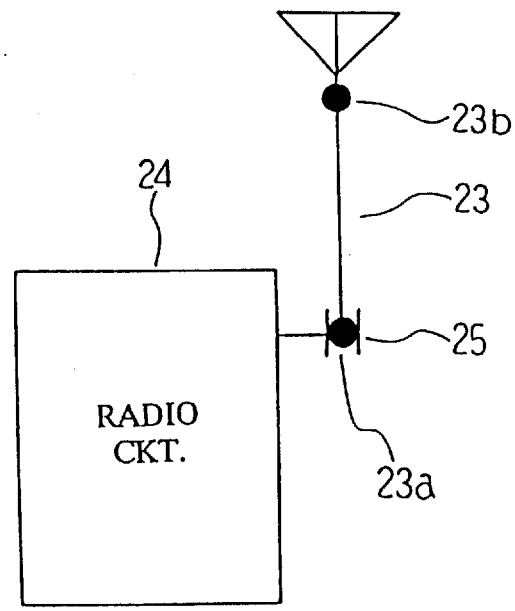
FIG. 53 illustrates a connection diagram of the conventional antenna equipment of FIG. 50.
Figure 54:
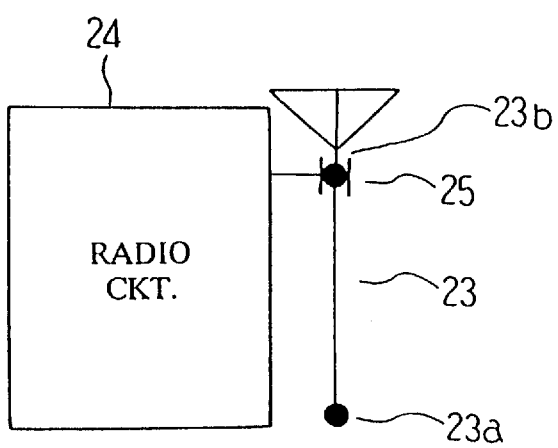
FIG. 54 illustrates a connection diagram of the conventional antenna equipment of FIG. 51.

FIGS. 49 and 50 illustrate a board element 43 as a possible replacement for the coil 11 discussed in the first embodiment. The board element 43 works as a reverse L board antenna with the antenna element 3 in a stored state. The board element 43 can achieve the same effect as that of the sixteenth embodiment.

The board element can perform better than the line element in terms of bandwidth of the Voltage Standing Wave Ratio VSWR characteristic.

Having thus described several particular embodiments of the invention, various alterations, modifications, and improvements will readily occur to those skilled in the art.

Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. Antenna equipment, comprising:
a case containing a radio circuit;
a first antenna element, connected to said radio circuit, which is movable between a stored position within said case and an extended position outside of said case; and
means, connected to said first antenna element, for acting as a matching circuit element when said first antenna element is in said extended position and as a second antenna element when said first antenna element is in said stored position;
said means being connected to a ground terminal when acting as said matching element, and being connected to an open terminal when acting as said second antenna element.

2. The antenna equipment of claim 1, wherein said acting means is provided outside of said case.

3. The antenna equipment of claim 2, wherein said acting means includes a first terminal which is coupled to one end of said first antenna element when said first antenna element is in said stored position, and which is coupled to a second end of said first antenna element when said first antenna element is in said extended position.

4. The antenna equipment of claim 3, wherein said acting means includes a second terminal, said equipment further comprising a switch which couples said second terminal to said ground terminal when said first antenna element is in said extended position and which couples said second terminal to said open circuit when said first antenna element is in said stored position.

5. The antenna equipment of claim 3, further comprising a stopper incorporating therein said first terminal, said stopper positioning said first antenna element with respect to said case and coupling said first terminal to one of said ends of said first antenna element.

6. The antenna equipment of claim 1, further comprising a signal line connected between said first antenna element and said radio circuit.

7. The antenna equipment of claim 6, wherein said signal line is selected from the group of a coaxial strip line, a coaxial line, a strip line, a triplet line, a Lecher line, and a coaxial line having a predefined shaped shield.

8. The antenna equipment of claim 4, wherein said acting means is selected from the group of a coil, a meander board, a chip, a line element, and a board element.

9. The antenna equipment of claim 4, further comprising a signal line having first and second ends, a hot conductor and a ground conductor, said signal line being connected at said first end thereof to said first antenna element and being connected at said second end thereof to said radio circuit;
wherein said ground conductor is coupled at said first end to a ground of said radio circuit.

10. The antenna equipment of claim 9, wherein said second end of said signal line includes a $\lambda/4$ choke, $\lambda$ being a wavelength of a signal on said signal line.

11. The antenna equipment of claim 4, further comprising an adjustment device, acting as a matching element, inserted between said second terminal and ground.

12. The antenna equipment of claim 11, wherein said adjustment device is selected from the group of an integrated circuit and a circuit board.

13. A method of communication using antenna equipment including first and second antenna elements coupled to a radio circuit, comprising the steps of:
extending said first antenna element to an extended position for a first communication condition;
connecting said second antenna element to a ground terminal so as to provide said second antenna element as a matching circuit for said first antenna element in said extended position;
retracting said first antenna element to a stored position for a second communication condition; and
connecting said second antenna element to an open terminal so as to provide said second antenna element as an antenna when said first antenna element is in said stored position.

14. The communication method of claim 13, wherein said matching circuit providing step comprises the steps of connecting one end of said second antenna element to a first end of said first antenna element and connecting a second end of said second antenna element to said ground terminal.

15. The communication method of claim 14, wherein said antenna providing step comprises the steps of connecting said one end of said second antenna element to a second end of said first antenna element and connecting said second end of said second antenna element to said open terminal.

16. The communication method of claim 15, further comprising the step of providing a signal line for said second antenna element with said first antenna element.

17. The communication method of claim 16, wherein said second antenna element is selected from the group of a helical antenna and a reverse L antenna.

18. Antenna equipment, comprising:
a case containing a radio circuit;
a first antenna element, connected to said radio circuit, which is movable between a stored position within said case and an extended position outside of said case;
means, connected to said first antenna element, for acting as a matching circuit element when said first antenna element is in said extended position and as a second antenna element when said first antenna element is in said stored position; and
a signal line connected between said first antenna element and said radio circuit, wherein said acting means includes a first terminal which is coupled to one end of said first antenna element when said first antenna element is in said stored position, and which is coupled to a second end of said first antenna element when said first antenna element is in said extended position, and wherein said acting means includes a second terminal, said equipment further comprising a switch which couples said second terminal to a ground terminal when said first antenna element is in said extended position and which couples said second terminal to an open circuit when said first antenna element is in said stored position.

19. The antenna equipment of claim 18, wherein said acting means is provided outside of said case.

20. The antenna equipment of claim 18, further comprising a stopper incorporating therein said first terminal, said stopper positioning said first antenna element with respect to said case and coupling said first terminal to one of said ends of said first antenna element.

21. The antenna equipment of claim 18, wherein said signal line is selected from the group of a coaxial strip line, a coaxial line, a strip line, a triplet line, a Lecher line, and a coaxial line having a predefined shaped shield.

22. The antenna equipment of claim 18, wherein said acting means is selected from the group of a coil, a meander board, a chip, a line element, and a board element.

23. The antenna equipment of claim 18, further comprising a signal line having first and second ends, a hot conductor and a ground conductor, said signal line being connected at said first end thereof to said first antenna element and being connected at said second end thereof to said radio circuit;

wherein said ground conductor is coupled at said first end to a ground of said radio circuit.

24. The antenna equipment of claim 23, wherein said second end of said signal line includes a $\lambda/4$ choke, $\lambda$ being a wavelength of a signal on said signal line.

25. The antenna equipment of claim 18, further comprising an adjustment device, acting as a matching element, inserted between said second terminal and ground.

26. The antenna equipment of claim 25, wherein said adjustment device is selected from the group of an integrated circuit and a circuit board.

27. A method of communication using antenna equipment including first and second antenna elements coupled to a radio circuit, comprising the steps of:

extending said first antenna element to an extended position for a first communication condition;

providing said second antenna element as a matching circuit for said first antenna element in said extended position;

retracting said first antenna element to a stored position for a second communication condition;

providing said second antenna element as an antenna when said first antenna element is in said stored position; and providing a signal line for said second antenna element with said first antenna element, wherein said matching circuit providing step comprises the steps of connecting one end of said second antenna element to a first end of said first antenna element and connecting a second end of said second antenna element to ground, and wherein said antenna providing step comprises the steps of connecting said one end of said second antenna element to a second end of said first antenna element and connecting said second end of said second antenna element to an open circuit.

28. The communication method of claim 27, wherein said second antenna element is selected from the group of a helical antenna and a reverse L antenna.

* * * * *